US009524532B2

(12) United States Patent
LeStrange et al.

(10) Patent No.: US 9,524,532 B2
(45) Date of Patent: Dec. 20, 2016

(54) SYSTEM AND METHOD FOR INTEGRATED MULTIPLE SOURCE PLAYER CASH ACCESS

(71) Applicant: Global Cash Access, Inc., Las Vegas, NV (US)

(72) Inventors: Mike LeStrange, Henderson, NV (US); Richard Beer, Prior Lake, MN (US); Craig Potts, Scottsdale, AZ (US); Tim Richards, Henderson, NV (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

(21) Appl. No.: 14/498,836

(22) Filed: Sep. 26, 2014

(65) Prior Publication Data

US 2015/0141125 A1    May 21, 2015

Related U.S. Application Data

(63) Continuation-in-part of application No. 13/890,943, filed on May 9, 2013, which is a continuation-in-part
(Continued)

(51) Int. Cl.
*G07F 17/32* (2006.01)
*G07F 19/00* (2006.01)
(Continued)

(52) U.S. Cl.
CPC ........... *G06Q 50/34* (2013.01); *A63F 3/00157* (2013.01); *G06Q 20/04* (2013.01); *G06Q 20/042* (2013.01);
(Continued)

(58) Field of Classification Search
CPC .............. G07F 17/3237; G07F 17/3239; G07F 17/3251; G07F 17/42; G07F 19/00; G07F 19/20
See application file for complete search history.

(56) References Cited

U.S. PATENT DOCUMENTS 4,689,742 A   8/1987  Troy et al.
4,764,666 A   8/1988  Bergeron
(Continued)

FOREIGN PATENT DOCUMENTS

EP   1 107 196   6/2001
GB   2 380 687   4/2003
(Continued)

OTHER PUBLICATIONS

International Search Report for Application Serial No. PCT/US04/32357 of Oct. 13, 2005.
(Continued)

*Primary Examiner* — Damon Pierce
(74) *Attorney, Agent, or Firm* — Weide & Miller, Ltd.

(57) ABSTRACT

The present invention relates to a system and method for integrating player tracking and cash access in a casino or other gaming environment. One aspect of the invention allows for fund access and management wherein gaming machines, such as slot machines or on-line virtual gaming machines, receive playable credits directly from a patron's banking or credit card account. Another aspect of the present invention relates to integrating player tracking and cash access transactions by allowing the players to provide a player tracking card for each financial transaction conducted in a gaming environment. In return, the casino issues gaming or bonus points to the players for allowing their transactions to be tracked. Yet another aspect of the present invention consolidates the players' financial account information into a single casino database. Players can subsequently credit or debit cash from the players' financial accounts using any associated customer identification cards or otherwise receive such credits in other forms that permit negotiations, including quasi-cash documents.

11 Claims, 14 Drawing Sheets

Related U.S. Application Data of application No. 10/957,283, filed on Oct. 1, 2004, now Pat. No. 8,696,463, said application No. 14/498,836 is a continuation-in-part of application No. 13/245,516, filed on Sep. 26, 2011, which is a continuation of application No. 12/268,857, filed on Nov. 11, 2008, now Pat. No. 8,025,216, which is a continuation of application No. 11/223,708, filed on Sep. 9, 2005, now Pat. No. 7,461,780.

(60) Provisional application No. 60/608,196, filed on Sep. 9, 2004.

(51) Int. Cl.

| | | |
|---|---|---|
| *G06Q 50/34* | (2012.01) | |
| *G06Q 20/04* | (2012.01) | |
| *G06Q 20/06* | (2012.01) | |
| *G06Q 20/40* | (2012.01) | |
| *G07F 7/08* | (2006.01) | |
| *A63F 3/00* | (2006.01) | |
| *G07F 17/42* | (2006.01) | |
| *G06Q 20/24* | (2012.01) | |

(52) U.S. Cl.
CPC ............ *G06Q 20/045* (2013.01); *G06Q 20/06* (2013.01); *G06Q 20/24* (2013.01); *G06Q 20/40* (2013.01); *G07F 7/08* (2013.01); *G07F 17/3223* (2013.01); *G07F 17/3237* (2013.01); *G07F 17/3239* (2013.01); *G07F 17/3244* (2013.01); *G07F 17/3246* (2013.01); *G07F 17/3251* (2013.01); *G07F 17/3255* (2013.01); *G07F 17/3286* (2013.01); *G07F 17/42* (2013.01); *G07F 19/00* (2013.01); *G07F 19/20* (2013.01)

(56) References Cited

U.S. PATENT DOCUMENTS

| | | |
|---|---|---|
| 4,882,473 A | 11/1989 | Bergeron et al. |
| 5,038,022 A | 8/1991 | Lucero |
| 5,179,517 A | 1/1993 | Sarbin et al. |
| 5,265,874 A | 11/1993 | Dickinson et al. |
| 5,321,241 A | 6/1994 | Craine |
| 5,429,361 A | 7/1995 | Raven et al. |
| 5,457,306 A | 10/1995 | Lucero |
| 5,470,079 A | 11/1995 | LeStrange et al. |
| 5,613,912 A | 3/1997 | Slater |
| 5,642,160 A | 6/1997 | Bennett |
| 5,663,546 A | 9/1997 | Cucinotta et al. |
| 5,679,938 A | 10/1997 | Templeton et al. |
| 5,741,183 A | 4/1998 | Acres et al. |
| 5,754,655 A | 5/1998 | Hughes et al. |
| 5,766,075 A | 6/1998 | Cook et al. |
| 5,770,533 A | 6/1998 | Franchi |
| 5,813,912 A | 9/1998 | Shultz |
| 5,864,623 A | 1/1999 | Messina et al. |
| 5,902,983 A | 5/1999 | Crevelt et al. |
| 5,919,091 A | 7/1999 | Bell et al. |
| 5,959,277 A | 9/1999 | Lucero |
| 5,991,410 A | 11/1999 | Albert et al. |
| 5,999,624 A | 12/1999 | Hopkins |
| 6,001,016 A | 12/1999 | Walker et al. |
| 6,044,360 A | 3/2000 | Picciallo |
| 6,048,269 A | 4/2000 | Burns et al. |
| 6,048,271 A | 4/2000 | Barcelou |
| 6,064,987 A | 5/2000 | Walker et al. |
| 6,081,792 A | 6/2000 | Cucinotta et al. |
| 6,124,947 A | 9/2000 | Seo |
| 6,162,122 A | 12/2000 | Acres et al. |
| 6,168,522 B1 | 1/2001 | Walker et al. |
| 6,244,958 B1 | 6/2001 | Acres |
| 6,275,991 B1 | 8/2001 | Erlin |
| 6,293,866 B1 | 9/2001 | Walker et al. |
| 6,302,793 B1 | 10/2001 | Fertitta, III et al. |
| 6,347,738 B1 | 2/2002 | Crevelt et al. |
| 6,352,205 B1 | 3/2002 | Mullins et al. |
| 6,361,437 B1 | 3/2002 | Walker et al. |
| 6,409,595 B1 | 6/2002 | Uihlein et al. |
| 6,431,983 B2 | 8/2002 | Acres |
| RE37,885 E | 10/2002 | Acres et al. |
| 6,486,768 B1 | 11/2002 | French et al. |
| 6,487,284 B1 | 11/2002 | Campbell |
| 6,505,772 B1 | 1/2003 | Mollett et al. |
| 6,547,131 B1 | 4/2003 | Foodman et al. |
| 6,575,832 B1 | 6/2003 | Manfredi et al. |
| 6,577,733 B1 | 6/2003 | Charrin |
| 6,579,179 B2 | 6/2003 | Poole et al. |
| 6,585,598 B2 | 7/2003 | Nguyen et al. |
| 6,601,040 B1 | 7/2003 | Kolls |
| 6,607,441 B1 | 8/2003 | Acres |
| 6,628,939 B2 | 9/2003 | Paulsen et al. |
| 6,675,152 B1 | 1/2004 | Prasad et al. |
| 6,676,522 B2 | 1/2004 | Rowe et al. |
| 6,682,421 B1 | 1/2004 | Rowe et al. |
| 6,709,333 B1 | 3/2004 | Bradford et al. |
| 6,800,029 B2 | 10/2004 | Rowe et al. |
| 6,843,412 B1 | 1/2005 | Sanford |
| 6,846,238 B2 | 1/2005 | Wells |
| 6,851,607 B2 | 2/2005 | Orus et al. |
| 6,852,031 B1 | 2/2005 | Rowe |
| 6,866,586 B2 | 3/2005 | Oberberger et al. |
| 6,951,302 B2 | 10/2005 | Potts |
| 6,997,807 B2 | 2/2006 | Weiss |
| 7,003,496 B2 | 2/2006 | Ishii et al. |
| 7,094,149 B2 | 8/2006 | Walker et al. |
| 7,168,089 B2 | 1/2007 | Nguyen et al. |
| 7,311,605 B2 | 12/2007 | Moser |
| 7,461,780 B2 | 12/2008 | Potts et al. |
| 7,922,581 B2 | 4/2011 | Potts |
| 8,025,216 B2 | 9/2011 | Potts et al. |
| 8,140,434 B2 | 3/2012 | DeCristoforo |
| 8,556,707 B2 | 10/2013 | Potts et al. |
| 8,696,463 B2 | 4/2014 | Potts et al. |
| 2001/0022849 A1 | 9/2001 | Simonoff |
| 2001/0050311 A1 | 12/2001 | Avellino |
| 2002/0002075 A1* | 1/2002 | Rowe .................. 463/25 |
| 2002/0039921 A1 | 4/2002 | Rowe et al. |
| 2002/0039923 A1 | 4/2002 | Cannon et al. |
| 2002/0045476 A1 | 4/2002 | Poole et al. |
| 2002/0068624 A1 | 6/2002 | Ellis |
| 2002/0103027 A1 | 8/2002 | Rowe et al. |
| 2002/0107072 A1 | 8/2002 | Giobbi |
| 2002/0132664 A1 | 9/2002 | Miller et al. |
| 2002/0147047 A1 | 10/2002 | Letovsky et al. |
| 2002/0177479 A1 | 11/2002 | Walker et al. |
| 2003/0033534 A1 | 2/2003 | Rand et al. |
| 2003/0036425 A1 | 2/2003 | Kaminkow et al. |
| 2003/0045353 A1 | 3/2003 | Paulsen et al. |
| 2003/0078094 A1 | 4/2003 | Gatto et al. |
| 2003/0087692 A1 | 5/2003 | Weiss |
| 2003/0104865 A1 | 6/2003 | Itkis et al. |
| 2003/0106769 A1 | 6/2003 | Weiss |
| 2003/0119585 A1 | 6/2003 | Walker et al. |
| 2003/0176218 A1 | 9/2003 | LeMay et al. |
| 2003/0186747 A1 | 10/2003 | Nguyen et al. |
| 2003/0211883 A1 | 11/2003 | Potts |
| 2003/0222153 A1 | 12/2003 | Pentz et al. |
| 2003/0228902 A1 | 12/2003 | Walker et al. |
| 2003/0236955 A1 | 12/2003 | Shergalis |
| 2004/0053693 A1* | 3/2004 | An ..................... 463/40 |
| 2004/0063494 A1 | 4/2004 | Oram et al. |
| 2004/0083693 A1 | 5/2004 | Keller et al. |
| 2004/0093303 A1 | 5/2004 | Picciallo |
| 2004/0173673 A1 | 9/2004 | Potts |
| 2004/0214643 A1 | 10/2004 | Parrott et al. |
| 2004/0229671 A1 | 11/2004 | Stronach et al. |
| 2005/0009600 A1 | 1/2005 | Rowe et al. |
| 2005/0054417 A1 | 3/2005 | Parrott et al. |
| 2005/0054446 A1 | 3/2005 | Kammler et al. |
| 2005/0080728 A1 | 4/2005 | Sobek |
| 2005/0096124 A1 | 5/2005 | Stronach |

(56) References Cited

U.S. PATENT DOCUMENTS

| | | |
|---|---|---|
| 2005/0107155 A1 | 5/2005 | Potts et al. |
| 2006/0148559 A1 | 7/2006 | Jordan et al. |
| 2006/0160610 A1 | 7/2006 | Potts |
| 2007/0060309 A1 | 3/2007 | Yankton et al. |
| 2007/0066386 A1 | 3/2007 | Shields |
| 2007/0213124 A1 | 9/2007 | Walker et al. |
| 2007/0243934 A1* | 10/2007 | Little .................... G07F 17/32 463/40 |
| 2010/0222132 A1 | 9/2010 | Sanford et al. |

FOREIGN PATENT DOCUMENTS

| | | |
|---|---|---|
| WO | 93/23817 | 11/1993 |
| WO | 94/16781 | 8/1994 |
| WO | 97/13228 | 4/1997 |
| WO | 01/57617 | 8/2001 |

OTHER PUBLICATIONS

International Search Report for Application Serial No. PCT/US04/32358 of Oct. 13, 2005.
AAMVA National Standard for the Driver License/Identification Card, Jun. 30, 2000, pp. 1-90.
Quinn, William, "Worth Their Weight in Gold," pp. 24-26, Apr. 1, 2003.
Examination Report issued by the Canadian Patent Office for serial No. 2541093, dated Feb. 23, 2012, 5 pages.

* cited by examiner

Gaming Wallet Account Master — 1000

1002 Owner ID - PLAYER JOHN DOE
Wallet level Feature Set - full01 ← 1006
Wallet level Rule Set - norestrict ← 1008

1004 Owner Credentials: Passwords, Biometrics, email addresses, mobile numbers, Out-of-band authorization methods

| ACCOUNT NAME (1010) | E-Wallet Account ID | Account reference number | Status | Last known balance (1016) | Feature Set (1022) | Rule Set (1020) | Access Config (1018) |
|---|---|---|---|---|---|---|---|
| GCA Wallet Cash account | 1 | NA | active | $1,250 | full01 | new01 | Local01 |
| Wells Fargo DEBIT (1012) | 2 | xxxx-xxxx-xxxx-xxxx | active | $758 | debit14 | pay01 | WF028 |
| Bank of America DEBIT (1014) | 114 | xxxx-xxxx-xxxx-xxxx | active | $4,750 | debit14 | pay01 | AdapPT |
| VISA CREDIT | 47 | xxxx-xxxx-xxxx-xxxx | active | unknown | credit01 | pay01 | ChasePT |
| MASTERCARD CREDIT | 519 | xxxx-xxxx-xxxx-xxxx | active | unknown | credit01 | pay01 | ChasePT |
| BANK CHECKING ACCOUNT | 14 | 7410055 1234567890123 | active | $18,275 | depo34 | pay01 | checkG |
| CLEARINGHOUSE LOAN | 4 | 985673232 | closed | unknown | loan02 | NA | NA |
| CASINO CREDIT | 20 | 71-567814350 | active | ($4,589) | credit02 | credit55 | NA |
| VENDOR CREDIT | 61 | 221-45730845 | locked | $12.00 | promo99 | NA | NA |
| South Point online poker | 19 | 6Adb14567 | active | Southchips | poker13 | poker13 | SouthP |
| Stratosphere online poker | 19 | 68HB94127 | active | 4500 SKYchips | poker14 | poker14 | Strato |
| Nevada Poker tournament | 33 | 11401010 | active | 1000 Tchips | poker20 | poker20 | Nvpool |
| KEY PLAYER BONUS CASH | 3 | xxxx-xxxx-xxxx-xxxx | active | $40 | promo99 | promo | NA |
| Casino X E-Wallet | 5 | 74567211 | active | $2,226 | subwallet | subw77 | NA |
| Casino Y earned loyalty points | 7 | PTC card number | active | 100000 Points | point07 | promo | NA |
| Paypal E-Wallet | 11 | 387344 | active | | xwallet | norestrict | PayP98 |
| Online Bank Debit Account | 112 | 988845672 1987123466 | closed | $14,630 | depo34 | full01 | WF028 |

FIG. 10

Account Feature Sets 1022

| Feature Set ID | Purchases from allowed | Withdrawal From Allowed | Deposits to Allowed | Wagering instrument | Currency type | Relationship Type | Currency conversion permitted |
|---|---|---|---|---|---|---|---|
| full02 | Yes | Yes | Yes | No | USD | external | No |
| xwallet | Yes | Yes | Yes | No | USD | peer | No |
| promo99 | Yes | No | Yes | Yes | USD | internal | No |
| full01 | Yes | Yes | Yes | No | USD | internal | Yes |
| debit14 | Yes | No | No | No | USD | external | No |
| credit01 | Yes | No | No | No | USD | external | Yes |
| depo34 | Yes | No | Yes | No | USD | external | No |
| loan02 | Yes | No | Yes | No | USD | external | No |
| point07 | No | Yes | Yes | No | points | internal | No |
| poker13 | No | No | Yes | No | SPchips | external | Yes |
| poker14 | No | No | Yes | No | Skychips | external | Yes |
| poker20 | No | Yes | Yes | Yes | Tchips | internal | No |
| credit02 | No | Yes | Yes | No | USD | external | No |
| subwallet | No | Yes | Yes | No | NA | child | Yes |

FIG. 11

Rule Sets 1020

| Rule Set Name | Min Balance | Max Balance | Daily withdrawal limit | Weekly Withdrawal limit | Monthly withdrawal limit | Gaming Venue Policy | Jurisdiction Policy |
|---|---|---|---|---|---|---|---|
| new01 | 0 | 10000 | 100 | none | 500 | anyAC | NJ001 |
| pay01 | none | none | 1000 | 1500 | 3000 | none | none |
| poker 13 | 0 | 500000 | 4500 | none | none | SPPoker | NV |
| poker 14 | 0 | 275000 | none | 5000 | none | SKYpoker | NV |
| norestrict | 0 | 100000 | 2000 | none | none | all006 | NJ&NV |
| poker20 | 150 | 4000000 | 3000 | none | none | NVPpool | NV |
| promo | none | 99999 | none | none | none | none | none |
| credit55 | -6500 | 0 | 2000 | none | none | Star | NV |
|  |  |  |  |  |  |  |  |
|  |  |  |  |  |  |  |  |

FIG. 12

Access Configurations 1018

| Access Config ID | Security type | Ref to Security credentials | Originating Enterprise ID |
|---|---|---|---|
| Local01 | | none | |
| ChasePT | PCI DSS | | Chase Payment Tech |
| checkG | SSL/TLS | SSL certificate | Telecheck |
| PayP98 | token passing | PKI token | Paypal |
| WF028 | PCI/DSS | SSL certificate | Wells Fargo |
| AdaPT | secure card auth | Card track fingerprint | Adaptive Payments |
| SouthP | user token | PKI token | SouthPoint online poker |
| Strato | Encrypted payload | Symetric Key Store | Stratosphere online poker |
| Nvpool | user token | PKI token | NV online tournaments |

FIG. 13

Gaming Venue Policies 1468

| Gaming Venue Policy Name | Gaming Venue Name #1 | Gaming Venue Name #2 | Gaming Venue Name #N |
|---|---|---|---|
| anyAC | Golden Nugget | Revel | etc.. |
| all006 | *any | | |
| SPPoker | SouthPoint Poker | | etc.. |
| SKYPoker | Stratosphere Poker | | |
| NVPpool | SouthPoint Poker | Stratosphere Poker | etc.. |
| Star | Star Casino | | |

FIG. 14

Legal Jurisdiction Policies 1574

| Jurisdiction Policy Name | Jurisdiction Name #1 | Jurisdiction Name #2 | Jurisdiction Name # N |
|---|---|---|---|
| NJ&NV | New Jersey | Nevada | |
| NJ001 | New Jersey | | |
| NV | Nevada | | |
| Southwest | Utah | Nevada | Arizona |

FIG. 15

SYSTEM AND METHOD FOR INTEGRATED MULTIPLE SOURCE PLAYER CASH ACCESS

CROSS REFERENCE TO RELATED APPLICATIONS

This application is a continuation-in-part of U.S. patent application Ser. No. 13/890,943, filed May 9, 2013, which is continuation-in-part of U.S. patent application Ser. No. 10/957,283, filed Oct. 1, 2004, now U.S. Pat. No. 8,696,463. This application is also a continuation-in-part of U.S. application Ser. No. 13/245,516, filed Sep. 26, 2011, which is a continuation of U.S. application Ser. No. 12/268,857, filed Nov. 11, 2008, now U.S. Pat. No. 8,025,216, which is a continuation of U.S. application Ser. No. 11/223,708, filed on Sep. 9, 2005, now U.S. Pat. No. 7,461,780 which claims priority to U.S. Provisional Application Ser. No. 60/608,196 filed on Sep. 9, 2004.

BACKGROUND OF THE INVENTION

The present invention relates to a system and method for integrating player tracking and cash access transactions in a casino environment. Specifically, the invention relates to a system and method, used in a variety of environments including casinos, to facilitate cash-access/credit-access and player tracking.

Casino gaming is a highly popular activity in today's society. Often times, enjoyment of the casino gaming experience is predicated upon a player's ability to easily and effectively access a sufficient supply of money, which in turn allows the player to participate in gaming activities for a desired length of time. Casino patrons typically attempt to bring a sufficient amount of currency to the casino that can be used with various gaming machines or exchanged for negotiable chips or casino-issued cards. Not infrequently, however, patrons forget to bring a sufficient amount of currency to the casino or patrons deplete the supply they brought before they are ready for the gaming experience to end.

In these instances, the casino patrons will want to access additional currency, or otherwise extend their time playing the casino games, by withdrawing the necessary currency from a financial institution at which the player maintains an account. For example, a player with a financial institution card, such as a credit card, debit card, or bank card, can utilize an automated teller machine (ATM) that is located on the casino's premises to withdraw currency.

Such financial institution transactions are commonplace in casinos. However, existing cash access and cash advance systems often require manual entry of customer identification information as part of the transaction. Existing systems may also require the players to remember multiple PIN's that are associated with each of their financial intuition accounts or require that the players retrieve cash at an ATM and then physically transport the cash to a gaming machine. Although these current processes allow access to currency, players continue to look for more convenience while at the casino. Therefore, a need exists for a system and method of facilitating expeditious cash/credit access for players in a casino environment that minimizes the complications that currently exist for such transactions.

In addition to the complications that hinder current cash/credit access systems and methods, these current systems and methods also fail to provide comprehensive tracking of the players' financial transactions in casinos. While it is commonplace to attempt to track some of the patrons' actions in a casino that relate to gaming, these attempts typically fail to capture many financial transactions that occur on the casino's premises and to provide a comprehensive picture of the cash flow in the casino. Often casinos will provide patrons with player tracking cards that the player inserts at gaming machines, which allows the casino to monitor some of the patrons' gaming activities. As an incentive to use the player tracking cards, casinos often award gaming points to the patrons to encourage use of the cards. However, many financial transactions that occur in a casino are not effectively monitored or tracked by the casino.

The quality and breadth of current player tracking can be increased by providing additional incentives to the players. Therefore, in addition to the need for facilitating expeditious cash/credit access transactions, there is a concurrent need for providing more comprehensive tracking of players' financial transactions in casinos.

SUMMARY OF THE INVENTION

The present invention generally relates to a system and method for integrating player tracking and cash access in a casino or other gaming environment.

Integrated Player Tracking/Cash Access System on Gaming Machine

One aspect of the present invention relates to a system and method for accessing and managing funds for cashless gaming. The invention has applicability to systems which include traditional gaming machines, such as dedicated slot or video poker gaming machines located in physical casinos, as well as on-line gaming systems such as where a game server interfaces with a player's presentation device, such as a player's computer, PDA, tablet or the like.

To initiate a transaction, a player provides a bank card or bank card/account information to the gaming machine (as indicated, such may comprise a traditional dedicated device or a presentation device which is coupled to a game server). The phrase "bank card" encompasses any card issued to the player by a bank or another financial institution and, as described below, might also include a digital wallet having associated bank card information. For instance, the bank card may be an Automated Teller Machine (ATM) card, debit card, credit card, or POS card. The bank card typically bares a magnetic strip that includes machine readable information that can be read by a magnetic strip reader on the gaming machine. The bank card may be associated with an independent financial account that is typically unrelated to the casino. Alternatively, the player may provide bank card or account information in other manners, such as by providing an image of the bank card or imputing bank card/account information, such as in the form of numeric account data.

After the player's bank card or other account-identifying information is introduced to the gaming machine, the machine electronically reads the card or accepts the bank card/account information and retrieves the machine readable information. The gaming machine processes the information to translate it into a machine usable format, such as binary or hexadecimal code. After successfully processing the bank card, the gaming machine prompts the player to select a transaction type, such as a credit or debit transaction. Upon receiving a selection from the player to perform a credit transaction, which requests that credit be added to the gaming machine, the machine prompts the player to enter a desired credit value that the player wishes to add to the machine. If necessary, the machine will also prompt the player to enter a Personal Identification Number (PIN) that is associated with the independent financial account.

Once the gaming machine has collected the transaction type and desired credit value from the player, along with any other necessary information, the machine electronically issues a request to the independent financial account to transfer the desired credit value from the financial account to the gaming machine or game server. The credit request includes the desired credit value and at least a portion of the data derived from the machine readable information, and the request is transmitted to an authorization center that is associated with the financial account. The gaming machine preferably communicates with an authentication server (such as directly, or in the case of an on-line environment, via a game server or the like), whereby the request is transmitted through the authorization server. The authorization center determines whether to approve the request and acts as an intermediary between the gaming machine and the financial account. Upon approval of the request, the desired credit value is electronically transferred from the financial account to the gaming machine or game server, and the player is then able to use the transferred credit on the gaming machine. This system and method allow a player to directly access funds for playing on a gaming machine without first visiting an ATM or other intermediate step for acquiring cash or credit.

When the gaming machine prompts the player to select a transaction type, the player may also select a debit transaction on the gaming machine. A debit transaction requests that the credit remaining on the gaming machine after the player has finished using the machine, or any credit won by the player on the gaming machine, be transferred to the independent financial account. The request effectively attempts to debit the gaming machine and credit the independent financial account. Upon receiving a selection from the player to perform a debit transaction, the gaming machine or server electronically issues a request to debit the player's gaming balance and transfer it to the independent financial account. The debit request, which is transferred to the authorization center, includes the dollar value to transfer and at least a portion of the machine readable information on the bank card. The authorization center determines whether to approve the request, and, upon approval, the winnings from the gaming machine are electronically transferred to the independent financial account.

Integrated Player Tracking/Cash Access System on ATM, CCCA, and Check Cashing Terminals Another aspect of the present invention relates to a system and method for integrating player tracking and cash access transactions in a gaming environment. To initiate a cash access transaction, a player introduces a bank card or bank card/account information (such as information which identifies a digital wallet having associated account information) into a banking machine in a casino environment. The banking machine may take a variety of forms, such as an ATM, Credit Card Cash Advance kiosk (CCCA), Check Cashing Terminal, on-line authorization server, and a gaming device equipped with cashless gaming software. As previously noted, the term "bank card" includes any of the various card types issued by banks or other financial institutions, and the bank card typically bares a magnetic strip that includes machine readable information. The banking machine includes a magnetic strip reader that can read and process the machine readable information on the card. The bank card is also associated with an independent financial account that is typically unrelated to the casino. Alternatively, as indicated herein, the banking machine may accept bank card information in other manners, such as in photographic form, or may accept other bank card/account information, such as numeric information.

After the player's bank card or other card/account information is introduced to the banking machine, the machine electronically reads the card or accepts the bank card/account information and retrieves the machine readable information. The banking machine processes the information to translate it into a machine usable format, such as binary or hexadecimal code. After successfully processing the bank card, the banking machine prompts the player to enter a transaction type. If the player wishes to withdraw cash from the independent financial account, the player may select a cash withdrawal transaction on the banking machine and indicate a desired cash value.

The system maintains a database of bankcard numbers and associates each of those numbers to a player's name and, optionally, a player tracking number. In order to track the transaction and associate it with the specific player performing the cash request, the banking machine prompts the player to provide his or her player tracking card (PTC) into the machine. The PTC is typically a casino-issued card that includes a unique identifier and is associated with the player in a player transaction database. The database may include a variety of data including a player profile, player transaction information, and other data relating to the player's activities in the casino. The player swipes or feeds the PTC into the banking machine, and the machine electronically processes the PTC. For instance, if the unique identifier on the PTC is encoded in a barcode, the banking machine will include a barcode reader capable of reading the barcode and decoding the encoded unique identifier. Alternatively, if the unique identifier on the PTC is encoded in a magnetic strip, the banking machine includes a magnetic strip reader for reading the strip and decoding the unique identifier.

After acquiring the appropriate data from the bank card, the PTC and the player, the banking machine electronically issues a request to the independent financial account to withdraw the desired cash value. The withdrawal request includes the desired value and at least a portion of the machine readable information on the bank card, and the request is transmitted to an authorization center. The authorization center is associated with the financial account and determines whether to approve the request. Upon approval of the request, the desired cash value is electronically transferred from the financial account to the banking machine and dispensed to the player in cash or gaming credit form.

The transaction is tracked so that the player's identity and the cash withdrawal amount are associated and stored in the transaction database. The transaction information can subsequently be used by the casino. The transaction information can provide the casino with valuable consumer behavior data, such as amounts and frequency of cash withdrawals by casino patrons. The casino, in turn, may issue gaming points to the player. The gaming points reward the player for offering the transaction information to the casino and for allowing that information to be tracked. Typically, gaming points can be redeemed for a variety of goods and services, such as free or discounted meals at the casino, hotel accommodations, and gift shop items. The number of points awarded to the player may be based on a variety of factors such as the number of cash withdrawal transactions performed by the player or the amount of cash withdrawn by the player. The overall system of integrating cash access and player tracking transactions thereby benefits both the players and the casino.

In an alternative embodiment, the system may operate without a multi-function banking machine that is capable of performing both cash access and player tracking functions as described above. Rather than provide the bank card and the PTC to a banking machine, these same cards may instead be presented to a casino representative. For instance, the casino may provide a central "cage" station at which a teller is available for processing the bank card and the PTC. If necessary, the teller will have card readers capable of processing magnetic strips, barcodes, or other forms of encoded information that resides on the bank card and the PTC. The teller will also have access to the transaction database and the authorization center, thereby allowing the teller to facilitate cash access and player tracking transactions. Aside from the added element of interacting with a casino representative, this alternative method operates similarly to the system described above.

Multi-Function Player Tracking Card

Yet another aspect of the present invention also relates to a system and method for integrating player tracking and enhanced cash access services in a gaming environment. First, an account is opened for a player at the casino. The system requires an initial setup by the player, where the player provides information to the casino. This is accomplished by having the player complete a form that includes personal data and information relating to at least one of the player's independent financial accounts. For instance, the player may provide the account information for one of the player's banking accounts or credit card accounts. The account information may include the player's name and other identifying information, an account and routing number, and a Personal Identification Number (PIN) if necessary to access the financial account. The player may also be required to provide other personal information such as the player's address, telephone number, and social security number. The information provided by the player is either entered electronically into a computer or entered onto a paper form and later entered into a computer by a casino representative. The player may also be required to prove his or her identity by providing a state-issued identification card, such as a driver's license. Information about the player may also be obtained from third parties or third party sources.

Once the player has provided the appropriate personal information and account information, this information is stored in a player tracking database. The player is then issued a PTC that contains a unique identifier. The unique identifier is also stored in the player tracking database and associated with the player's personal information and financial account information.

With the player's casino account successfully opened, the player is able to use the PTC to access cash or credit for gaming purposes in the casino. For example, a cash access machine of the present invention, such as a multi-function ATM, may be adapted to electronically process the PTC. The cash access machine reads and electronically processes the PTC to retrieve the unique identifier. If the unique identifier on the card is encoded in a barcode, the cash access machine will include a barcode reader capable of reading and decoding the unique identifier. The machine then prompts the player to select a transaction type, and, in response, the player elects to perform a cash withdrawal.

The cash access machine communicates with the player tracking database to determine which financial account is associated with the unique identifier on the player's PTC. If more than one financial account is associated with the unique identifier, the machine may prompt the player to select one of the accounts for the withdrawal. Next, the cash access machine electronically issues a withdrawal request to the selected financial account to withdraw the desired cash value. The request includes the desired cash value and the necessary account information and PIN associated with the financial account, which the player provided at the time he or she opened the casino account.

The withdrawal request is transmitted to an authorization center that is associated with the financial account, and the authorization center determines whether to approve the request. Upon approval of the request, the desired cash value is electronically transferred from the financial account to the cash access machine. If the machine is an ATM, the cash value is typically dispensed to the player in cash form, which the player can then use in the casino. If the machine is a slot machine, or other gaming machine, the cash value may be directly credited to the machine and used for gaming purposes.

Importantly, because the financial account information is initially provided by the player and stored in the player tracking database, the subsequent withdrawal request can be issued to the independent financial account without requiring a bank card, such as an ATM card or credit card, from the player. The player tracking database links the unique identifier on the casino-issued PTC with all the necessary financial account information necessary to withdraw cash.

The withdrawal transaction is also tracked by the casino such that the unique identifier on the player's card and the cash withdrawal amount are associated with each other and stored in the transaction database. The casino may then issue gaming points to the player based on the number of withdrawal transactions or the amount withdrawn. If the player is identified by the system, the player tracking database may also store the awarded gaming points and associate them with the player's unique identifier. The gaming points reward the player for offering cash withdrawal information to the casino and for electing to use the system of the present invention to obtain cash or credit in the casino. The system thereby benefits both the player and the casino by integrating cash access and player tracking.

Other embodiments are also disclosed including the use of an ATM or similarly equipped gaming machine for authorizing the transfer of money to the machine or ATM in order to be converted into a casino ticket. In this context, a casino ticket can be any number of identification cards or systems including a paper ticket with a bar code, a magnetic stripe card, a smart card, RFID or other portable digital memory that is encoded with personal and financial information. This casino ticket can then be used on another gaming machine as credit in connection with casino gaming or redeemed for cash. In the preferred embodiment, in order to redeem the casino ticket for cash, the customer can either present the casino ticket for validation by a cashier at a cashier cage or insert the casino ticket into a ticket redemption kiosk (including kiosks integrated with one or more casino game machines or other multi-purpose entertainment devices). The casino ticket could also be created in a way that permits (or limits) negotiation within different geographical areas (such as a group of mutually linked casinos, restaurants and service providers), to acquire different products or services (such as 50% or more must be used to purchase goods), to trigger different bonuses or awards (free games, discounts, casino points), or any number of features that either limit negotiation or enhance the functionality and features available to the player. In one embodiment, the player account may comprise a digital wallet.

Digital Wallets

Other aspects of the invention comprise the creation and use of digital wallets. Preferably, information regarding one or more financial accounts of a player is associated with the player's digital wallet, such as bank (savings/checking) accounts, credit or debit accounts, casino accounts or the like. In addition, use of the digital wallet and/or various accounts thereof, may be subject to certain rules or preferences, such as determined by various rules sets. The digital wallet may be associated with or be identified by a player's tracking card/account or may be associated with or be identified by a separate card or identification information.

Additional aspects of the invention relate to on-line gaming environments, linking of vendor and casino systems, and cardless player identification.

These and other embodiments will be further described with reference to the figures below.

BRIEF DESCRIPTION OF THE DRAWINGS

FIG. 10 illustrates an example data file which represents a digital wallet of the present invention;

FIG. 11 illustrates an example table of account features sets of the present invention;

FIG. 12 illustrates an example table of rule sets of the present invention;

FIG. 13 illustrates an example table of access configurations of the present invention;

FIG. 14 illustrates an example table of gaming venue policies of the present invention;

FIG. 15 illustrates an example table of legal jurisdiction policies of the present invention.

DETAILED DESCRIPTION OF THE INVENTION

Figure 1:
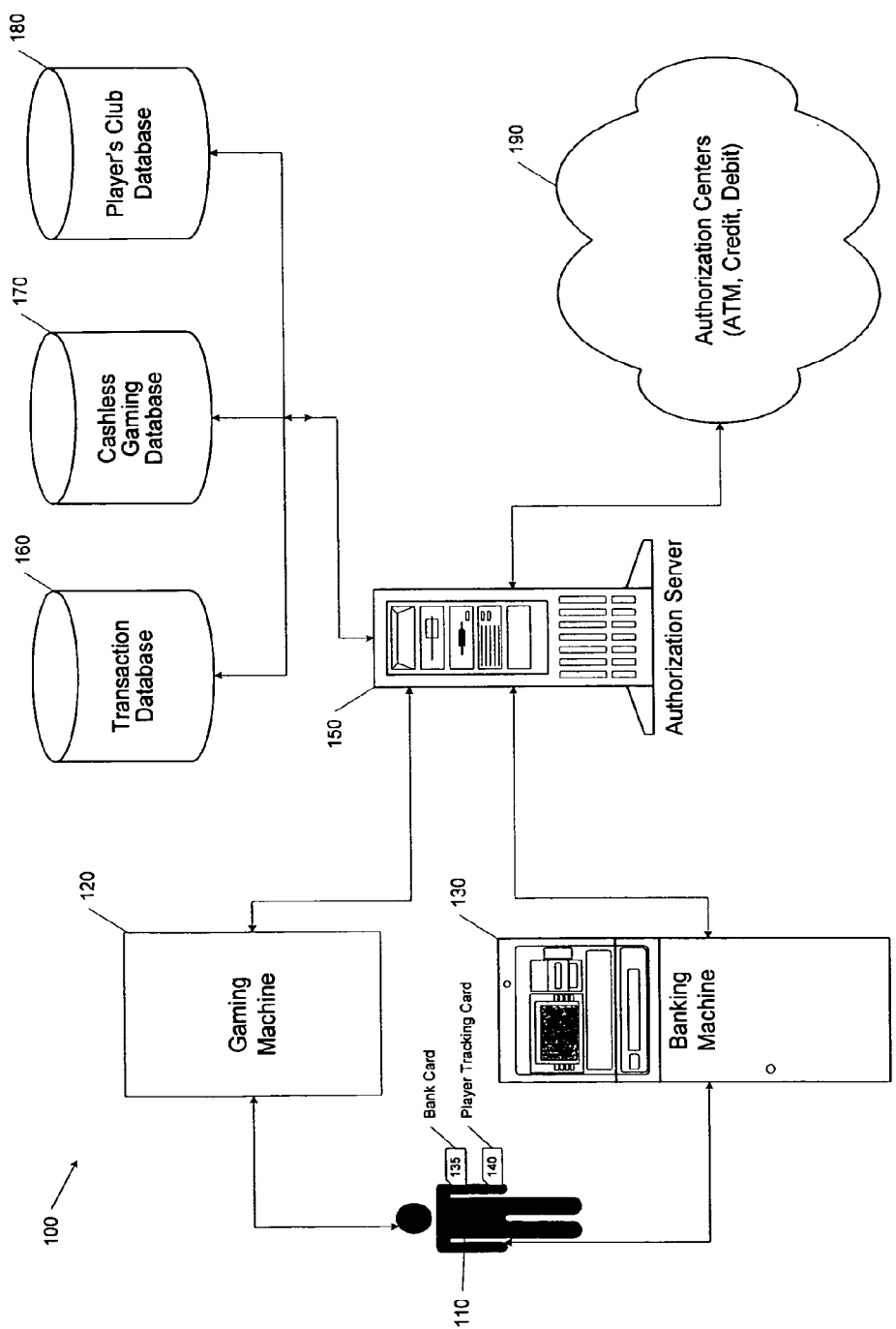
FIG. 1 is a block diagram of an integrated player tracking and cash access system in accordance with an embodiment of the present invention.
Figure 9:
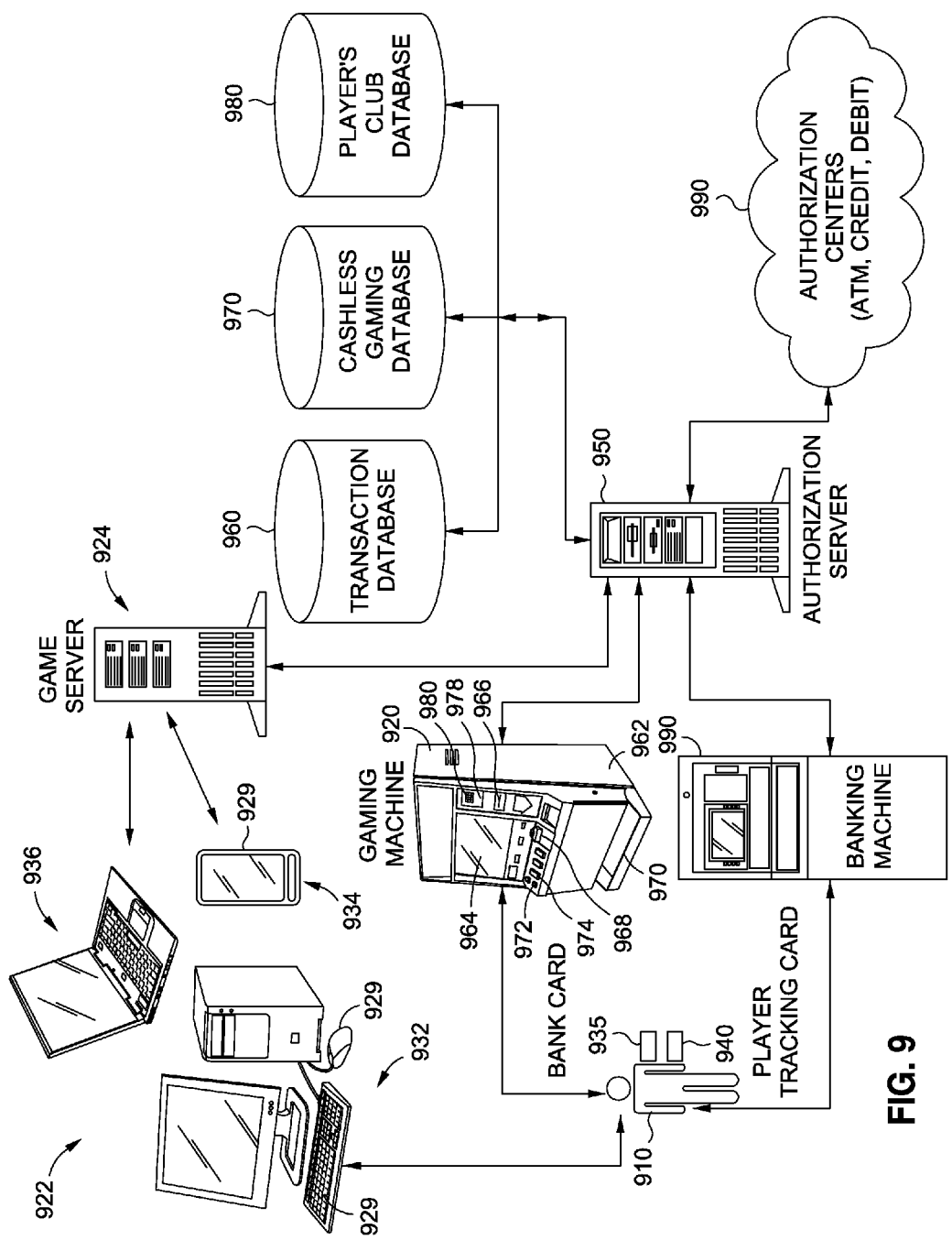
FIG. 9 is a block diagram of alternate integrated player tracking and cash access system in accordance with an embodiment of the invention.

One embodiment of a integrated player tracking and cash-access system 100 is shown in FIG. 1. In one embodiment, the system 100, which contains the elements described herein, is operated in a casino environment. As used herein, a "casino environment" may comprise a physical casino environment, such as a land-based casino, riverboat, cruise ship or the like (i.e. a physical location at which casino-style wagering is presented, such as via gaming machines and gaming tables), and/or an "on-line" environment, such as where casino-style wagering is presented to a player via computing device, PDA, tablet or the like, such as via a server. FIG. 1 illustrates a traditional casino environment, while FIG. 9 illustrates such an environment which includes on-line gaming.

Relative to the system 100 illustrated in FIG. 1, the system 100 includes players 110 who interact with a plurality of gaming machines 120 and banking machines 130. The players interact with the machines through any methods known in the art such as buttons and touch-sensitive screens. A player 110 is issued a bank card 135 and a player tracking card (PTC) 140 as described in more detail herein. The gaming machine 120 and the banking machine 130 are configured to read the information contained on the bank card 135 and a PTC 140 as provided for in more detail below.

The gaming machines 120 may have various forms and a plurality of features. For example, as illustrated in FIG. 9, such a gaming machine 920 may include a housing or cabinet 962 for enclosing/supporting various components of the gaming machine. The housing 962 may have a variety of configurations. In one embodiment, as illustrated, the housing 962 is configured so that the machine has an "upright" configuration. The casino gaming machine 920 might also be configured as a "slant"-type, a "bar-top" or have other forms.

In one embodiment, the gaming machine 926 may be configured as a "video" type gaming machine, the machine including at least one display 964 for displaying game information to a player. The gaming machine 920 may include other means for providing information to a player. For example, speakers (not shown) or other devices may be provided for generating sound associated with the game. The gaming machine 920 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming machine 920 thus includes a bill validator/acceptor 966 for accepting paper currency and a coin acceptor 968 for accepting coins. Other means of payment, such as a credit card reader, may be provided. An award of winnings in the form of coins may be paid to the player via a coin tray 970.

Preferably, the gaming machine 920 includes means for a player to provide input. In one embodiment, this means comprises one or more buttons. For example, a "spin" button 972 may be provided for permitting a player to start a game. One or more wager buttons 974 may be provided for a player to select the amount to bet on a particular game. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the gaming machine 920. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 970 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The gaming machine 920 may include one or more random number generators for generating random game events and results. As indicated above, such a random number generator might be utilized to generate the game symbols for the positions of a matrix, be utilized to generate the base symbols, and be utilized to select award values for each symbol position, among other things.

As indicated, in one embodiment, game information is displayed by a video display 964 to a player. That display may be of a variety of types, including CRT, LCD, plasma and others. The gaming machine 920 may also include more than one video display.

In another embodiment, the gaming machine 920 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

Such gaming machines 920 may have other configurations, including other features. For example, the gaming machine 920 may include a player tracking device, such as a card reader 978 and associated keypad 980. Such player tracking devices are well known and may permit the game operator to track play of players of the gaming machine. The tracked play may be utilized to offer player bonuses or awards.

In one embodiment, the gaming machine 920 may be configured to dispense media, such as printed paper tickets, which have associated value. For example, winnings or unused credits may be returned to the player via a printed ticket having value or associated value. In one embodiment, the gaming machine 920 might also be configured to accept such media for providing credit for game play.

A casino may have numerous such gaming machines 920, such as located on a casino floor or in other locations. Of course, such gaming machines 920 might be used in other environments, such as an airport, a bar or tavern or other locations.

The PTC 140 is typically a casino-issued card, which is used to track the player's actions in the casino or to track the player's casino-related activities, such as on-line game play as described below. The casino may award gaming points for certain player actions and associates the gaming points with the PTC.

The bank card 135 may be any type of card that is issued to the player 110 by a bank or other independent financial institution, and the bank card is associated with an independent financial account at the financial institution. For instance, the bank card 135 may be an Automated Teller Machine (ATM) card, debit card, credit card, or POS card. The bank card 135 includes machine readable information, which, in a preferred embodiment, is encoded in a magnetic strip (not shown) on the card that can be read by a card reader (not shown) on the gaming machine 120.

As described in more detail below, a player 110 can bring his or her bank card 135 or PTC 140 to either the gaming machine 120 or the banking machine 130. The gaming machine 120 is configured to perform traditional gaming functions, such as providing an interactive slot machine game, and is also configured to allow the player 110 to perform cashless gaming and player tracking transactions. The banking machine 130 is configured to perform traditional transactions such as cash withdrawal, credit/debit transactions, and electronic fund transfers, which are well known in the art. The banking machine 130 of the present invention is also configured to perform cashless gaming and player tracking transactions as described herein.

To perform these functions, both the gaming machine 120 and the banking machine 130 communicate with an authorization server 150 to transmit information relating to the bank card 135 and a PTC 140 as well as other information relating to cash-access and player tracking transactions. While the authorization sever 150 is typically located at or near the casino environment, it may also be physically located outside of the casino so long as it is configured to communicate with the gaming machine 120 and the banking machine 130. The casino, or a casino vendor, will typically maintain the authorization server 150 to ensure that it functions properly. The authorization server 150 stores a subset of the information it receives on a transaction database 160, a cashless gaming database 170, and a player's club database 180. The authorization server 150 also retrieves information from these databases, including information that is stored on the databases by the authorization server 150 as well as other information that resides on the databases.

The transaction database 160 stores information relating to the player's transactions including the types of transactions performed by the player 110 and the dollar amounts of those transactions. The transaction database 160 associates the transaction information with an identifier that uniquely identifies the player 110. In addition, the transaction database 160 may also store information regarding the player's credit history. When a commission is collected for utilizing the integrated player tracking and cash-access system 100, the appropriate commission information for each player 110 is also stored on the transaction database 160 as are commission fee overrides for certain players such as VIP's. The cashless gaming database 170 stores financial account information provided by the player 110, and the cashless gaming database 170 associates the account information with the player's unique identifier. The gaming points awarded to the player 110 are associated with the PTC 140 and stored on the player's club database 180. The player's club database 180 maintains each player's total awarded gaming points and increments and decrements the total points according to the players' accumulation and usage of points.

The authorization server 150 may also communicate with various authorization centers 190 to request authorization for the various transactions described herein. The authorization centers 190 are typically associated with financial accounts owned by the player and are configured to either credit or debit those financial accounts.

Integrated Player Tracking/Cash Access System on Gaming Machine

Figure 2:
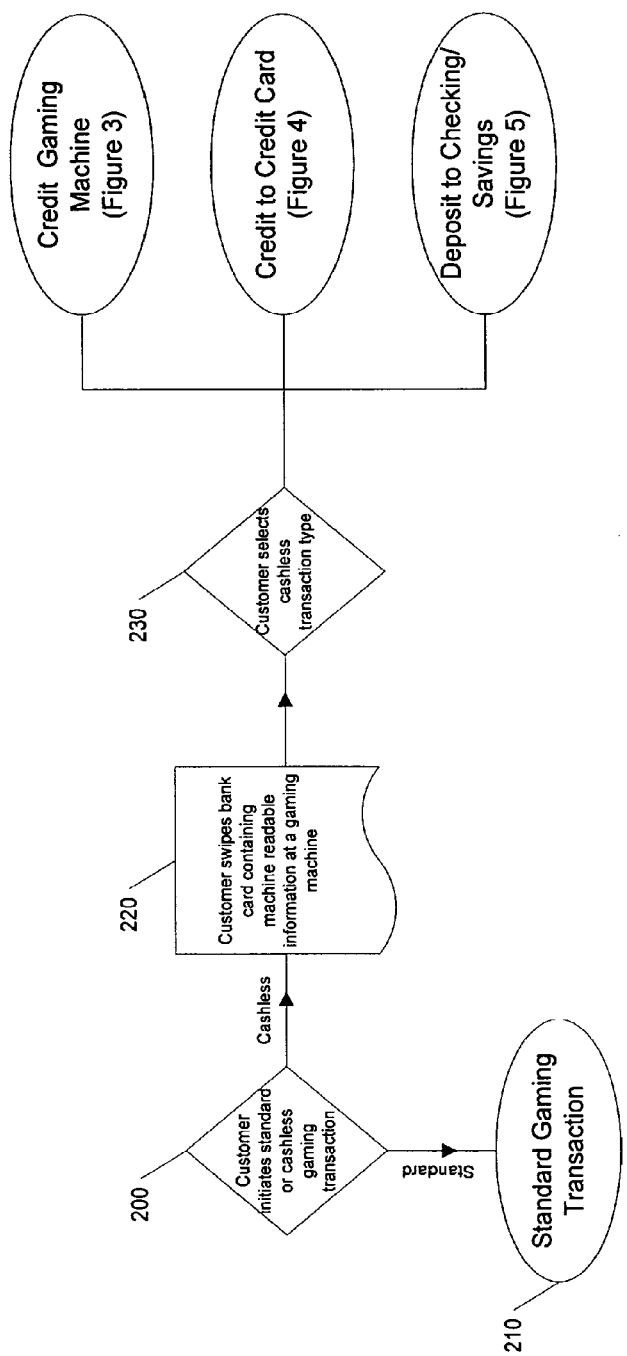
FIG. 2 is a flow diagram of a method for initiating a player tracking/cash access transaction on a gaming machine in accordance with the present invention.

In operation, and with reference to FIGS. 1 and 2, one aspect of the present invention relates to a system and method for accessing and managing funds for cashless gaming. At step 200, the player 110 selects either a standard gaming transaction or a cashless gaming transaction, and the banking machine receives the selection. At step 210, if the player 110 selects a standard gaming transaction, the gaming machine 120 operates as a traditional betting apparatus, such as a slot machine, and the player 110 uses cash or another known method to acquire credits on the gaming machine 110.

At step 220, if the player 110 wishes to perform a cashless transaction, which will credit the gaming machine 120, the player 110 provides the bank card 135 to the gaming machine 120. The player 110 swipes the bank card 135 through a card reader (not shown) of the gaming machine 120 or otherwise introduces the bank card 135 to the gaming machine 120 through a method known in the art.

After the player's bank card 135 is introduced to the gaming machine 120, the card reader electronically reads and decodes the machine readable information on the bank card 135. The gaming machine 120 processes the information to translate it into a machine usable format, such as binary or hexadecimal code. After successfully processing the bank card 135, the gaming machine 120 prompts the player to select a transaction type, such as crediting the gaming machine 120 or crediting a financial account that is associated with the bank card 135. At step 230, the player 110 selects a cashless transaction type. In one embodiment of the present invention, the transaction types include "Credit Gaming Machine," "Credit to Credit Card," and "Deposit to Checking/Savings."

Figure 3:
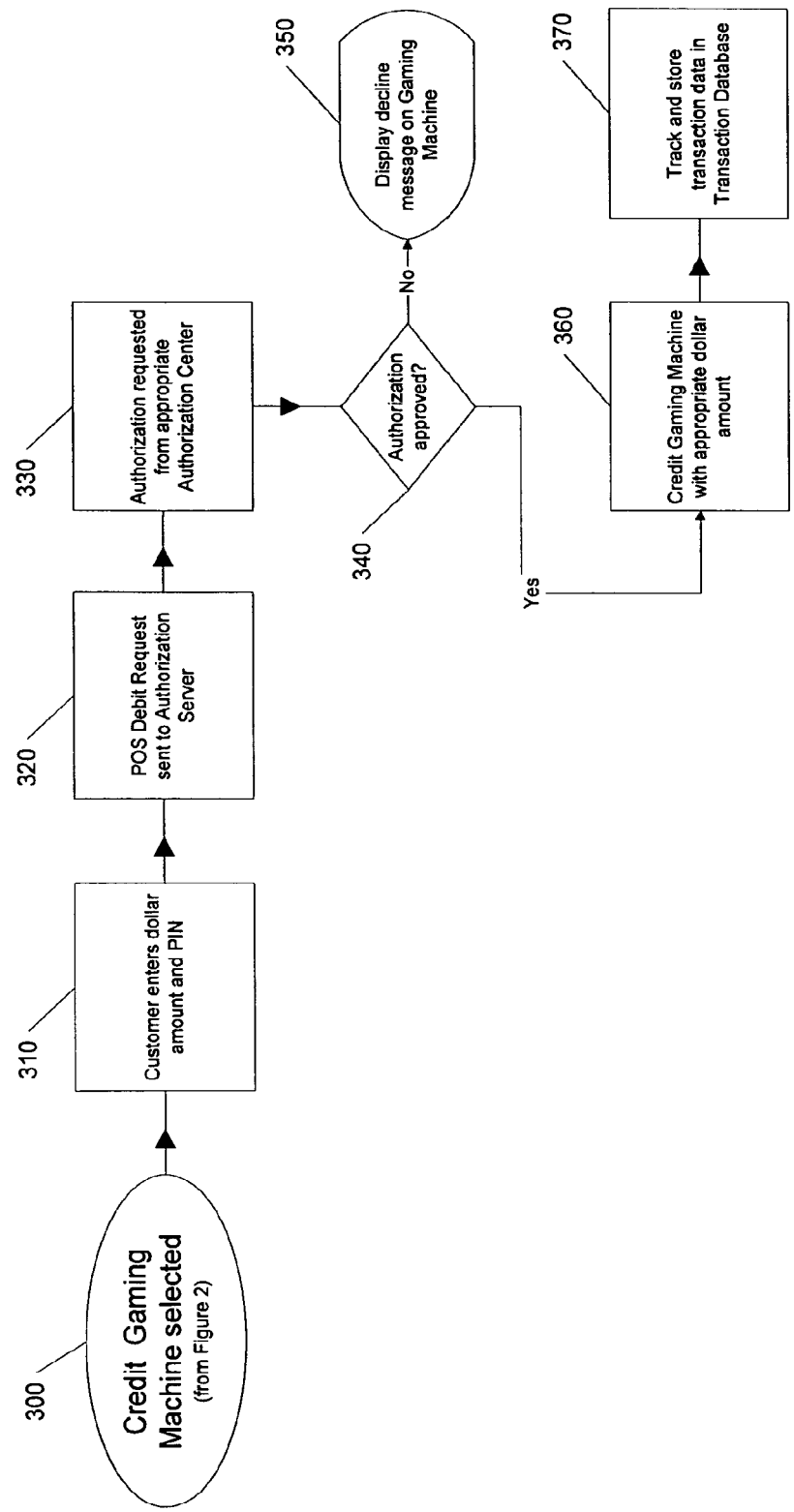
FIG. 3 is a flow diagram of a method for completing a player tracking/cash access transaction where the gaming machine is credited in accordance with the present invention.

With reference to FIGS. 1 and 3, if the player 110 selects the transaction type "Credit to Gaming Machine," step 300, the gaming machine 120 proceeds with a gaming machine credit transaction, which requests that a specified credit be added to the gaming machine 120 from the player's independent financial account. At step 310, the gaming machine 120 prompts the player 110 to enter a desired credit value that the player 110 wishes to add to the gaming machine 120. If necessary, the gaming machine 120 will also prompt the player 110 to enter a PIN, which is used to verify permission to access to the independent financial account, and any other information that is required to transfer funds from the independent financial account.

At step 320, the gaming machine 120 electronically issues a debit request, such as a Point of Sale (POS) debit request, to the authorization server 150, which attempts to debit the independent financial account and credit the gaming machine 120. The request includes the desired credit value and at least a portion of the data derived from the machine readable information.

Although the request attempts to transfer the desired credit value to the gaming machine 120, the total amount requested from the independent financial account may actually exceed the desired credit value when a commission is charged for performing the transaction. The authorization server 150 determines the total amount to request from the independent financial account; the total amount is typically the desired credit value plus a commission or transaction fee. The appropriate commission may be determined based on the specific player 110 requesting the funds and a player profile that is associated with the player. The player profile (not shown), which indicates the player's preference level, may be stored on the transaction database 160 or player's club database 180. For instance, a new player may have a standard commission taken out of his or her winnings, whereas a VIP player may have the commission waived altogether based on the VIP's player profile.

At step 330, once the total request amount has been established, the authorization sever 150 transmits the debit request to the authorization center 190, which is associated with the independent financial account. At step 340, the authorization center 190 determines whether to approve the request. At step 350, if the request is not approved by the authorization center 190, a decline message is transmitted from the authorization center 190 to the authorization server 150. The authorization server then 150 instructs the gaming machine 120 to display a message to the player 110 indicating that the gaming machine 120 was not credited and that the player 110 may see a casino cashier (not shown) if the player believes an error has occurred.

At step 360, if the request is approved by the authorization center 190, the desired credit value is electronically transferred from the financial account to the gaming machine 120 via the authorization server 150. If a commission is required for the transaction, the additional amount of the commission is also transferred from the independent financial account. The desired credit value is credited to the gaming machine 120, and the player 110 is able to use the transferred credit to place bets on the gaming machine 120 and perform standard gaming transactions as described in step 210.

At step 370, the authorization sever 150 tracks the successful request, and data relating to the transaction is stored in the transaction database 160. The data stored in the transaction database 160 may include the dollar value credited to the machine and the commission paid for the transaction. If the authorization server 150 has identified the player 110 performing the transaction, the player's identity may also be stored in the transaction database 160 and associated with the other transaction data. The authorization server 150 may identify the player 110 by requesting that the player enter identifying information into the gaming machine 120. The identifying information may be provided by having the player 110 swipe the PTC 140, which uniquely identifies the player 110, through the card reader on the gaming machine 120. If the player is awarded gaming points for performing a successful cashless gaming transaction, the points may be accumulated, stored, and associated with the player 110 on the player's club database 180.

Figure 4:
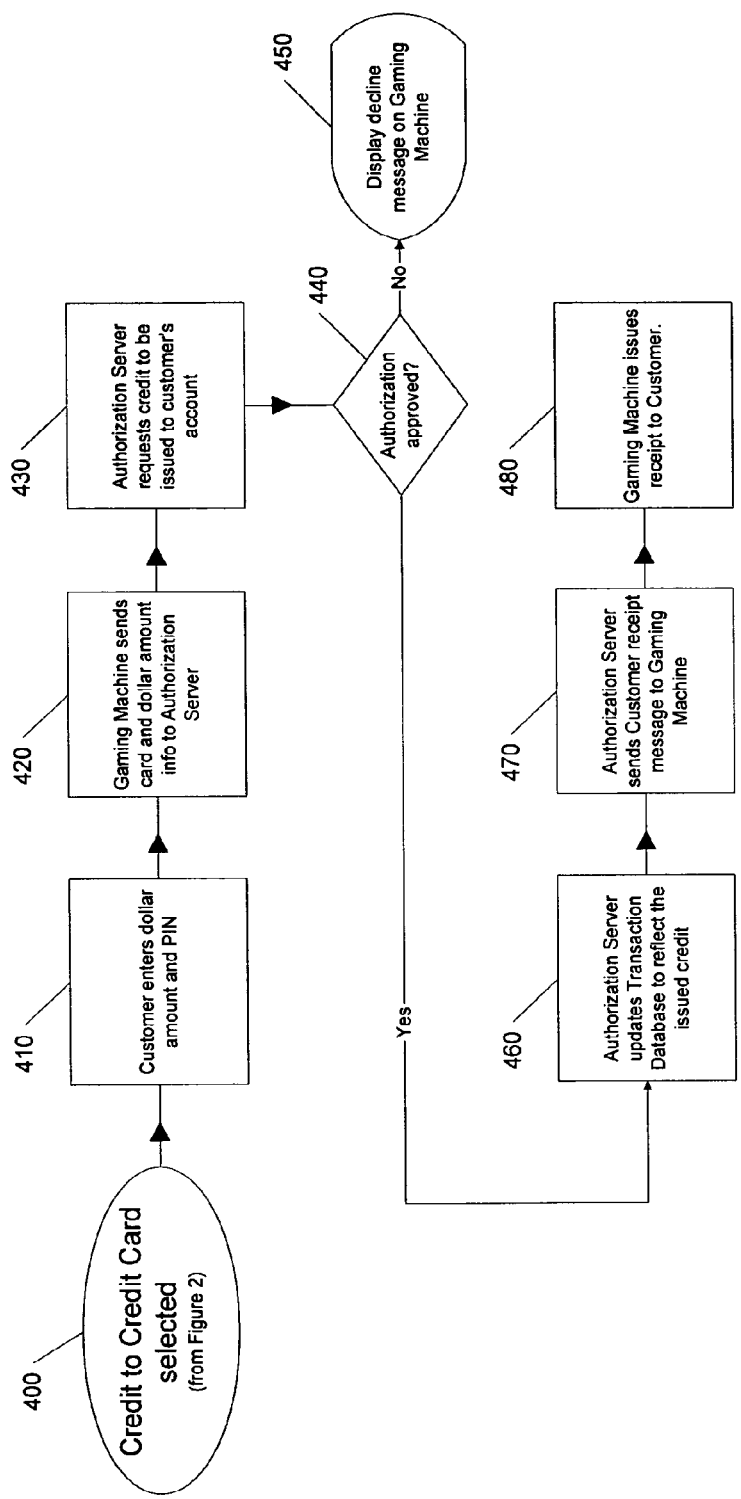
FIG. 4 is a flow diagram of a method for completing a player tracking/cash access transaction where a credit card account is credited in accordance with the present invention.

With reference to FIGS. 1 and 4, if the player 110 selects the transaction type "Credit to Credit Card," step 400, the gaming machine 120 proceeds with a credit to credit card transaction, which requests that credit be added to the independent financial account. This type of transaction is particularly appropriate when the player 110 has completed playing on the gaming machine 120 and wishes to "cash out" his or her winnings or the remaining credit on the gaming machine. The player 110 may cash out either all of the credits or a portion of the credits. In this aspect of the present invention, the independent financial account is typically a credit card account, and the bank card 135 is typically a credit card that is associated with the credit card account.

At step 410, the gaming machine 120 prompts the player 110 to enter a desired credit value that the player 110 wishes to add to the independent financial account that is associated with the bank card 135. If necessary, the gaming machine 120 will also prompt the player 110 to enter a PIN, which is used to verify permission to access to the independent financial account, and any other information that is required to transfer finds to the independent financial account.

At step 420, the gaming machine 120 electronically issues a credit request to the authorization server 150. The request includes the desired credit value and at least a portion of the data derived from the machine readable information on the bank card 135. Although the request attempts to transfer the desired credit value to the independent financial account, the total amount transferred to the independent financial account may actually be less than the desired credit value if a commission is charged for performing the transaction. The authorization server 150 determines the total amount to request to transfer to the independent financial account. The total amount is typically the desired credit value less a commission or transaction fee.

At step 430, once the total request amount has been established, the authorization sever 150 transmits the credit request to the authorization center 190, which is associated with the independent financial account. At step 440, the authorization center 190 determines whether to approve the request, and if the request is approved, the independent financial account is credited with the total request amount. At step 450, if the request is not approved by the authorization center 190, a decline message is transmitted from the authorization center 190 to the authorization server 150. The authorization server then 150 instructs the gaming machine 120 to display a message to the player 110 indicating that the independent financial account was not credited.

At step 460, if the request is approved and the total request amount is credited to the independent financial account, the authorization server 150 receives notification from the authorization center 190 of the successful request, and the authorization server 150 updates the transaction database 160 to reflect the completed transaction. Data relating to the transaction, such as the dollar value credited to the financial account and the commission paid for the transaction, is stored on the transaction database 160. If the authorization server 150 has identified the player 110 performing the transaction, the player's identity may also be stored in the transaction database 160 and associated with the other transaction data. If the player is awarded gaming points for performing a successful cashless gaming transaction, the points may be accumulated, stored, and associated with the player 110 on the player's club database 180. At step 470, the authorization server 150 transmits a receipt message to the gaming machine 120, and at step 480, the gaming machine 120 issues a receipt to the player 110.

Figure 5:
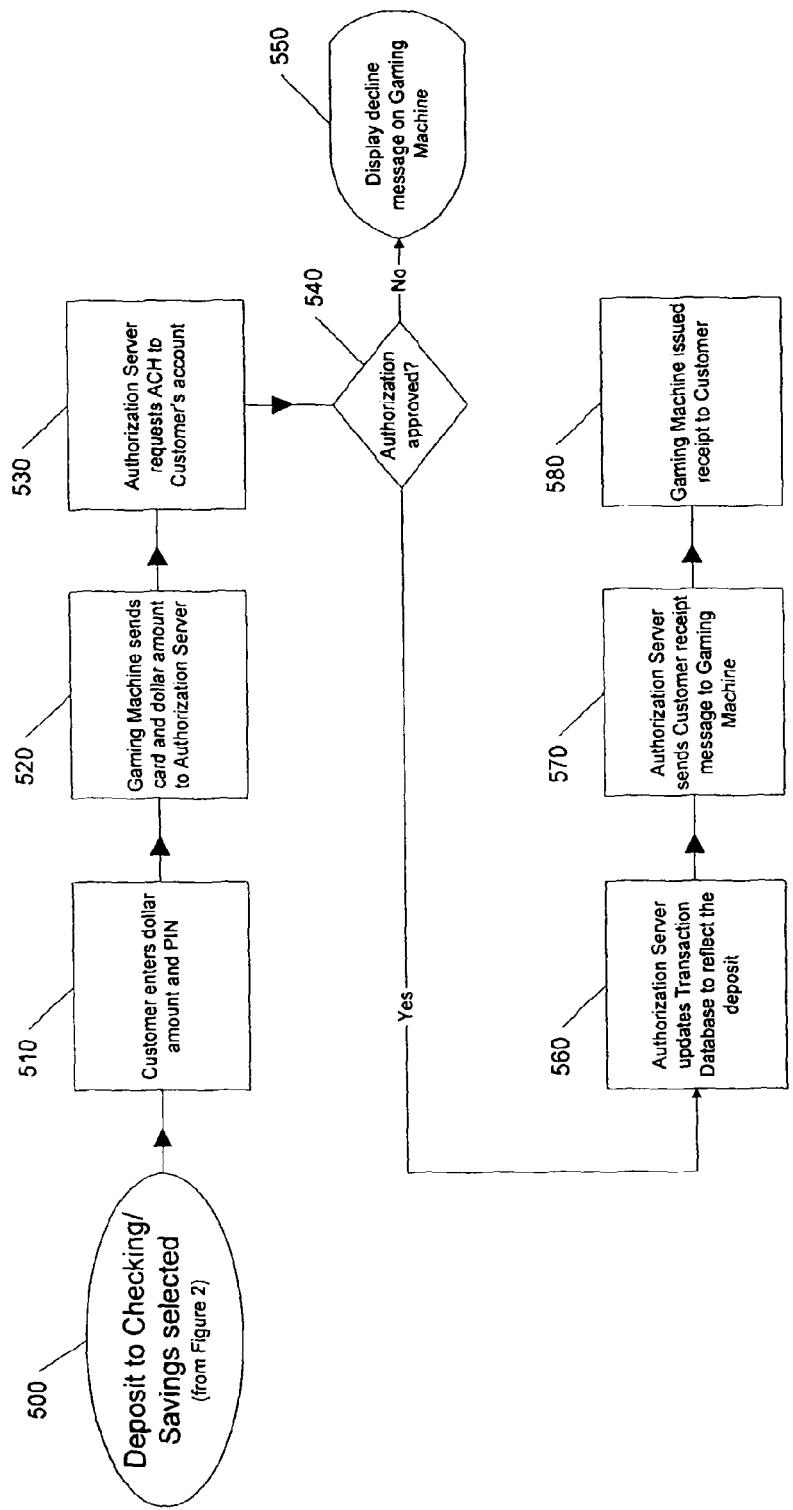
FIG. 5 is a flow diagram of a method for completing a player tracking/cash access transaction where a checking or savings account is credited in accordance with the present invention.

With reference to FIGS. 1 and 5, if the player 110 selects the transaction type "Deposit to Checking/Savings," step 500, the gaming machine 120 proceeds with a deposit to checking or savings account transaction. This transaction requests that a deposit be made to the independent financial account. In this aspect of the present invention, the independent financial account is typically a checking or savings account, and the bank card 135 is typically an ATM card that is associated with the checking or savings account. This type of transaction is also appropriate when the player 110 has completed playing on the gaming machine 120 and wishes to cash out.

At step 510, the gaming machine 120 prompts the player 110 to enter a desired credit value that the player 110 wishes to add to the independent financial account that is associated with the bank card 135. If necessary, the gaming machine 120 will also prompt the player 110 to enter a PIN, which is used to verify permission to access to the independent financial account, and any other information that is required to transfer finds to the independent financial account.

At step 520, the gaming machine 120 electronically transmits a deposit request to the authorization server 150. The request includes the desired deposit value and at least a portion of the data derived from the machine readable information on the bank card 135. The authorization server 150 determines the total amount to request to transfer to the independent financial account. The total amount is typically the desired deposit value less a commission or transaction fee.

At step 530, once the total request amount has been established, the authorization sever 150 issues a deposit request, such as an Automated Clearing House (ACH) request, to the authorization center 190, which is associated with the independent financial account. At step 540, the authorization center 190 determines whether to approve the request, and if the request is approved, the total request amount is deposited in the independent financial account. At step 550, if the request is not approved by the authorization center 190, a decline message is transmitted from the authorization center 190 to the authorization server 150. The authorization server then 150 instructs the gaming machine 120 to display a message to the player 110 indicating that the deposit was not made to the independent financial account.

At step 560, if the request is approved and the total request amount is deposited in the independent financial account, the authorization server 150 receives notification from the authorization center 190 of the successful request, and the authorization server 150 updates the transaction database 160 to reflect the deposit. Data relating to the transaction, such as the dollar value deposited to the financial account and the commission paid for the transaction, is stored in the transaction database 160. If the authorization server 150 has identified the player 110 performing the transaction, the player's identity may also be stored in the transaction database 160 and associated with the other transaction data. If the player is awarded gaming points for performing a successful cashless gaming transaction, the points may be accumulated, stored, and associated with the player 110 on the player's club database 180. At step 570, the authorization server 150 transmits a receipt message to the gaming machine 120, and at step 580, the gaming machine 120 issues a receipt to the player 110.

Integrated Player Tracking/Cash Access System on ATM, CCCA, and Check Cashing Terminals In another aspect of the present invention, the system 100 provides for integrating player tracking and cash access transactions. As previously described, when the player 110 requests a credit transfer to the gaming machine 120 using the bank card 135, the machine may prompt the player 110 to provide the PTC 140 to identify the player to the gaming machine. Further, when the player attempts to obtain cash from the banking machine 130 using the bank card 140, the banking machine 130 may also prompt the player to provide the PTC 140 as described herein.

Figure 6:
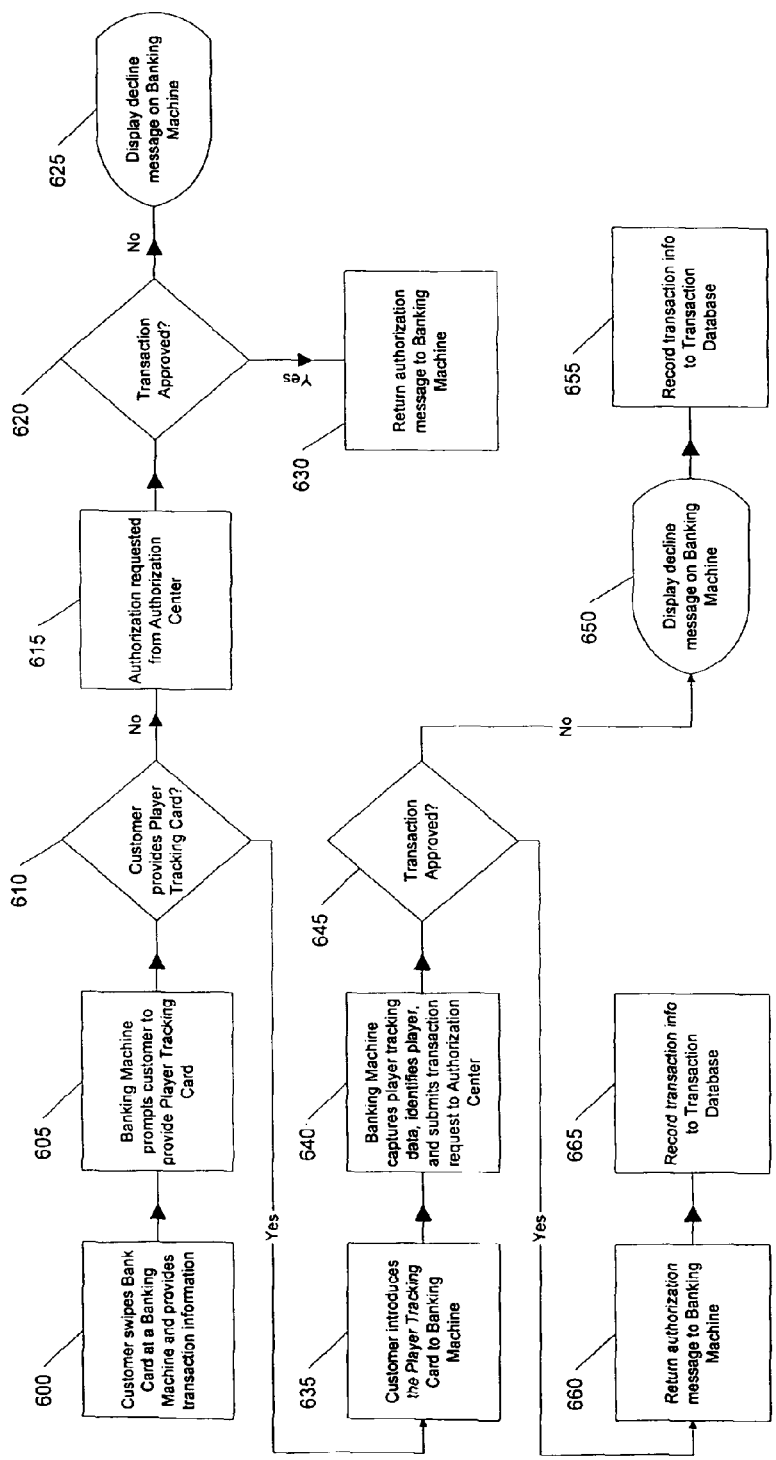
FIG. 6 is a flow diagram of a method for integrating player tracking and cash access transactions in accordance with the present invention.

With reference to FIGS. 1 and 6, to initiate a cash access transaction, the player 110 introduces the bank card 135, which is associated with the player's independent financial account, into the banking machine 130, at step 600. In a preferred embodiment, the machine readable information on the bank card 135 is encoded in a magnetic strip, and the player 110 swipes the bank card 135 through the card reader (not shown) of the banking machine 130. The card reader is configured to read the encoded magnetic strip. After the player's bank card 135 is introduced to the banking machine 130, the card reader electronically reads and decodes the machine readable information on the banking card. The banking machine 130 processes the information to translate it into a usable format.

In addition to providing the bank card 135 to the banking machine 130, the player 110 also enters into the banking machine 130 a desired cash value that the player wishes to obtain from the banking machine 130. If necessary, the player 110 will also enter a PIN, which is used to verify permission to access to the independent financial account, and any other information that is required to access funds from the independent financial account.

At step 605, the banking machine 130 prompts the player to provide the PTC 140, and at step 610, the player 110 decides whether to provide the PTC 140. If the player 110 does not decide to provide the PTC 140, the banking machine 130 proceeds with the cash access transaction. At step 615, the banking machine 130 electronically issues a request to the authorization server 150, which attempts to obtain cash from the independent financial account. The request includes the desired cash value and at least a portion of the data derived from the machine readable information on the bank card 135. Although the request attempts to transfer the desired cash value to the player 110, the total amount requested from the independent financial account may actually exceed the desired cash value to allow for commissions and bank charges that may be assessed for performing the transaction.

The authorization server 150 determines the total amount to request from the independent financial account, which is typically the desired cash value plus the commission or transaction fee. As previously described, the commission or transaction fee may be determined based on the player profile of the player 110. Once the total request amount has been established, the authorization sever 150 transmits the cash request to the authorization center 190, which is associated with the independent financial account.

At step 620, the authorization center 190 determines whether to approve the request. At step 625, if the request is not approved by the authorization center 190, a decline message is transmitted from the authorization center 190 to the authorization server 150. The authorization server then 150 instructs the banking machine 130 to display a message to the player 110 indicating that the request failed. At step 630, if the request is approved by the authorization center 190, an authorization message is transmitted from the authorization center 190 to the banking machine 130. The desired cash value is dispensed by the banking machine 130 to the player 110. If a commission is required for the transaction, the additional amount of the commission is also transferred from the independent financial account to the party receiving the commission.

Returning to step 610, where the player 110 decides whether to provide the PTC 140, if the player 110 chooses to provide his or her PTC 140 to the banking machine 130, the system 100 will be able to track the cash access transaction performed by the player 110. At step 635, if the player provides the PTC 140 to the banking machine 130, the banking machine reads the PTC. The PTC 140 includes machine readable information, which is stored on the PTC by a storage means such as a magnetic strip, barcode, integrated circuit, digital image, optical memory, or finger imaging.

The banking machine 130 is configured to read the machine readable information on the PTC 140, and at step 640 the banking machine 130 attempts capture the machine readable information. If the machine readable information is encoded, the banking machine 130 attempts to decode the information into a usable format. The banking machine 130 determines whether the machine readable information on the PTC 140 is readable and correctly formatted, and, if not, the banking machine 130 displays a message to the player 110 indicating the error.

If the machine readable information is readable and correctly formatted, the banking machine 130 attempts to identify the player 110 and determine whether the PTC can be validated against the transaction database 160 or the player's club database 180 by transmitting the decoded information from the banking machine 130 to the authorization server 150. The authorization server 150 then communicates with the transaction database 160 or the player's club database 180 to verify that the PTC is valid and to identify the player 110. If the PTC cannot be validated against one of the databases, the banking machine 130 displays a message to the player 110 indicating the error. If the PTC is successfully validated, the banking machine 130 continues processing the request.

Once the banking machine 130 collects the necessary transaction information, the machine electronically issues a request to the authorization server 150, which attempts to obtain cash from the independent financial account. The request includes the desired cash value and at least a portion of the data derived from the machine readable information on the bank card 135. As described herein, the total amount requested from the independent financial account may actually exceed the desired cash value to account for commissions and bank charges that may be assessed for performing the transaction. The authorization server 150 determines the total amount to request from the independent financial account. Once the total request amount has been established, the authorization sever 150 transmits the cash request to the authorization center 190, which is associated with the independent financial account.

At step 645, the authorization center 190 determines whether to approve the request. At step 650, if the request is not approved by the authorization center 190, a decline message is transmitted from the authorization center 190 to the authorization server 150. The authorization server 150 then instructs the banking machine 130 to display a message to the player 110 indicating that the request failed. Although the transaction was not successful insofar as the player 110 did not receive the requested cash, the transaction information is tracked and recorded nonetheless. At step 655, upon receiving the decline message, the authorization server 150 stores the relevant transaction information on the transaction database 160.

Returning to step 645, where the authorization center 190 determines whether to approve the request, if the request is approved by the authorization center 190, an authorization message is transmitted from the authorization center 190 to the banking machine 130 via the authorization server 150 at step 660. The desired cash value is dispensed by the banking machine 130 to the player 110. If a commission is required for the transaction, the additional amount of the commission is also transferred from the independent financial account to the party receiving the commission. At step 665, upon receiving the authorization message, the authorization server 150 stores the relevant transaction information on the transaction database 160.

Multi-Function Player Tracking Card

In yet another aspect of the present invention, the system 100 provides for an alternate method of performing integrated player tracking and cash access transactions. In this aspect of the present invention, a method is provided that facilitates player tracking and cash access transactions with a single card, rather than with the combination of the bank card 135 and the player tracking card 140. This aspect of the invention requires the player to initially provide financial account information to the casino, and that information is stored in the cashless gaming database 170. A subsequent withdrawal request can then be issued to the independent financial account without requiring a bank card, such as an ATM card or credit card, as described herein.

Figure 7A:
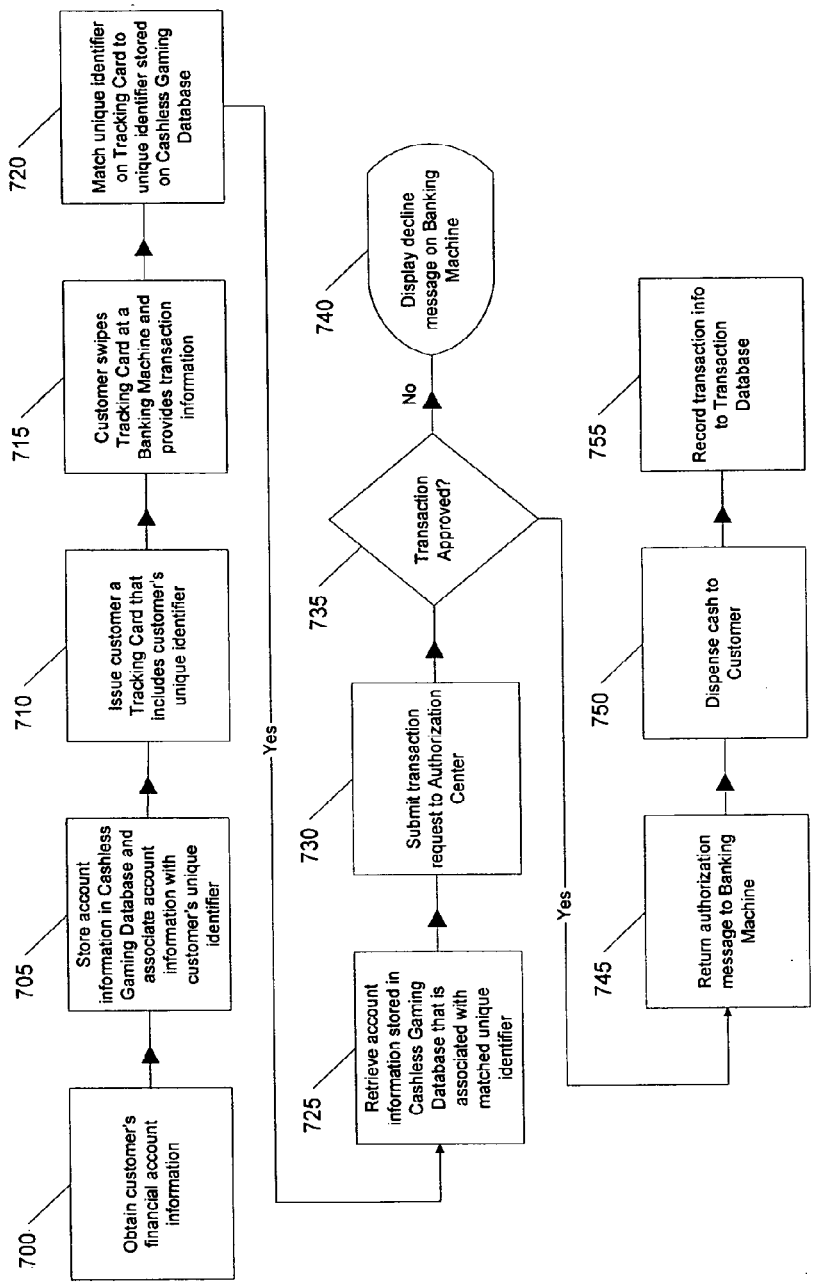
FIG. 7A is a flow diagram of a another method for integrating player tracking and cash access transactions in accordance with the present invention.
Figure 7B:
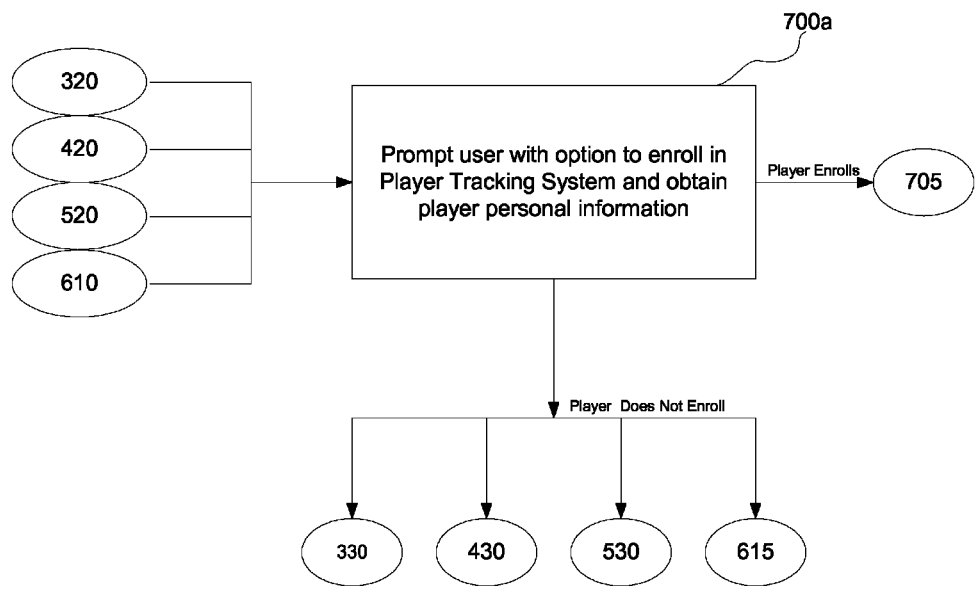
FIG. 7B is a flow diagram of an exemplary method of obtaining for obtaining customer financial account information for integrating player tracking and cash access transaction in accordance with the present invention.

With reference to FIGS. 1, 7A, and 7B, at step 700 the player 110 opens an account with the casino or with a vendor that manages accounts on the casino's behalf. To open the account, the player 110 provides specific information to the casino. This can be accomplished by the player 110 completing a form that includes personal data and information relating to the player's independent financial account. As previously described, the independent financial account may be any type of financial account, such as a banking account or credit card account. The player 110 may already have a card associated with the financial account, such as an ATM card, a credit/debit card. Alternatively, where the financial account is a checking account, the player might have existing checks that include a routing number and an account number, which the player can provide to the casino.

The account information provided by the player 110 may include data such as the player's name and other identifying information, an account and routing number, and a PIN. The player 110 may also be required to provide other personal information such as the player's address, telephone number, and social security number. The player 110 may have already provided some of this information to the casino, for instance, if the player 110 previously applied for a player tracking card 140. If the casino already has the player's personal information, it may not be necessary to re-acquire the information. The player 110 may also be required to prove his or her identity at the time the account is opened by providing a state-issued identification card, such as a driver's license.

Information about the player may also be obtained from third parties or third party sources. For example, subject to the player's consent, information about the player might be obtained from source credit reporting agencies or the like. Information obtained from the player may be augmented with such third party source information and/or the third party source information may be used to authenticate or confirm information which was provided by the player. The third party source information may be stored in the Cashless Gaming Database 170 and the Player's Club Database 160. Should a player establish account at multiple casinos, the previously obtained and verified information can be made available via the authorization server 150, thus greatly simplifying the player's enrollment process and the cost of verification.

The information which a player may be required to provide may vary, such as to comply with local jurisdictional rules or regulations. In some instances, such as based upon jurisdictional rules or regulations, a player may be permitted or required to set limits upon aspects of their gaming activity such as, but not limited to, wagering amounts, game play time or combinations thereof. The player may provide some or all of this information to a casino via a printed form (where after the data may be manually entered or scanned) or via an online/Internet based data entry form.

The player may also open an account via an "opt in" process when the player completes a transaction without a player tracking card as explained above with reference to FIGS. 3-6. For example, after the player provides financial account information, if the player is not yet enrolled in the player tracking system in steps 320, 420, 520, and 610, the authorization server 150 may control the gaming machine 120 or banking machine 130 to prompt the player to "opt in" to the player tracking system, as shown in step 700a in FIG. 7B. In this manner, the player does not need to fill out a separate form or go through a separate procedure to enroll in the player tracking system and to utilize the multi-function player tracking card.

If the player does "opt in," the player's financial information is saved, and the player is prompted to provide the additional personal identifying information as described above, for example, by providing a state-issued identification card, such as a driver's license. The personal identification may be manually entered or may be parsed from the state-issued identification card as described in U.S. 2012/0123943 A1, the contents of which are herein incorporated by reference in their entirety. If the player does not opt in, then the player proceeds with the transaction without the player tracking card as discussed above with reference to FIGS. 3-6.

As indicated above, a player may sign up with the casino's player club by filling out a form or the like. However, as indicated above, a player may not already be a member of the casino's player club when they wish to engage in a transaction and some players are deterred from joining the casino's player club because of the separate sign-up process. Also, another problem in the prior art is that cash or financial transactions are generally processed and tracked separately from player tracking or club information and transactions. For example, as illustrated in FIG. 1, one system and associated databases may be used to process cash or financial transactions (such as using databases 168,170). On the other hand, player club information and transactions may be stored or tracked separately (such as via database 180).

In a preferred embodiment of the invention, the multi-function player tracking card and/or a player casino wallet (as described in greater detail below), may be generated as a result of a processing a monetary transaction for a player. In one embodiment, a player may seek to perform a cash transaction, such as described in U.S. 2012/0123943 A1. As described therein, in one example, the player may present a banking card at a processing device, such as a kiosk, ATM or terminal, or at a casino cage (or other location for initiating a financial transaction). Upon receiving initial authorization, the player may complete the transaction at a casino cage or other location by providing identity information.

In accordance with the invention, when a player seeks to complete the monetary transaction, the system or cage cashier may capture player information to either update/supplement player information relative to an existing multi-function player tracking card and/or casino wallet, or to generate such. For example, upon attempting to complete a cash transaction at a casino cage, the cage operator may query the player or system and determine that the player does not have a multi-function player tracking card or casino wallet. In that event, the operator may capture the player's financial account information (bank card information, such as account number, or banking account information, such as the ABA routing number and bank account number from a check, etc.). The operator may also capture or obtain player identification information, such as from a player's driver's license or directly from the player (orally or via input to a terminal, etc.). For example, the operator may capture a player's driver's license number, social security number, date of birth, full name, address or other information.

As indicated in U.S. 2012/0123943, this information (player financial account information and identity verification information) may be used to complete a monetary transaction, such as a cash advance. The information may be stored, such as in the cashless gaming database 170 and/or transaction database 160.

In one embodiment, the information which is collected to perform the monetary transaction may also be used to create a multi-function player tracking card or digital wallet for the player. The card or wallet might automatically be created. However, in a preferred embodiment, as described above, the player may have the option of "opting in" (or out). For example, the cage operator might request approval from the player or the player might be required to submit approval via an input device of their desire to create such a card or account. If the player opts in, then the information is preferably duplicated or provided to the player's club database for use in creating the player's player card or digital wallet. For example, upon opting in, the system may create a new player card or wallet account in the club/wallet database, where that account is populated with information obtained from the monetary transaction/database.

The player may be requested to provide additional information and may be provided with information and/or a card. For example, for security purposes the player may be required to provide a PIN, password or other verifying information in order to access their newly created player card/account or wallet. The PIN or password might be selected by the player (such as by being input into an input device at the casino cage) or might be assigned to the player. The player may also be issued a physical card (as described herein) which bears player account information and/or other data (which card may then later be used by the player to access their account/wallet, such as to perform additional monetary transactions). The player might also be required or be permitted to provide an email address or other contact information.

In accordance with this aspect of the invention, the process of creating a multi-function player card/account or digital wallet is streamlined via integration of that process with an existing monetary transaction. Thus, when a player is already engaged in a monetary transaction, such an account or wallet can be created for the player at minimal inconvenience to the player. This also avoids the need for the player to provide all of the same information at a separate time.

Likewise, in accordance with this embodiment of the invention, information which is utilized to process a player's monetary transaction can be used to create a player's card/account or wallet, even when the systems or databases relating thereto are different. In particular, when a player's monetary transaction is processed, information relating thereto which is used by a monetary transacting system may be duplicated or used to create a player card/account or digital wallet relative to a casino club or other system/database.

At step 705, the information provided by the player is either entered electronically into a computer or written on a paper form and later entered into a computer by a casino representative. Once the casino has acquired the necessary information from the player 110, the financial account information and the player's personal information are stored and associated in the cashless gaming database 170. The player 110 is issued a unique identifier, typically a number or alpha-numeric string that is also stored on the cashless gaming database 170 and associated with the player's financial account information.

At step 710, once the casino has acquired the necessary personal information and financial account information from the player 110, the casino issues the player 110 a PTC 140 that bears the unique identifier that was assigned to the player 110 and stored in the cashless gaming database 170. The unique identifier borne by the PTC 140 is readable by both the gaming machine 120 and the banking machine 130. As described herein, the gaming machine 120 and the banking machine 130 can read the unique identifier on the PTC 140, communicate with the cashless gaming database 170, and match the unique identifier with the player's financial account information and personal information stored on the cashless gaming database 170.

The player 110 may now use the PTC 140 to access cash or credit from the gaming and banking machines, or to perform any other function that could otherwise be performed by an ATM card or a credit/debit card that is associated with the independent financial account. For instance, if the player 110 introduces the PTC 140 to the gaming machine 120, the player may request that a credit be added to the gaming machine directly from the independent financial account. Alternatively, if the player 110 introduces the PTC 140 to the banking machine 130, the player may issue a cash request from the financial account without providing a bank card.

The following example describes the process of accessing cash from the banking machine 130 with the PTC 140, but a similar process may be performed to access credit on the gaming machine 120 with the PTC 140. At step 715, the player 110 initiates a cash access transaction by introducing the PTC 140 into the banking machine 130. As previously described, the machine readable information on the PTC 140 is encoded, and the player 110 swipes the PTC 140 through the card reader of the banking machine 130, which handles the encoded information. After the player's PTC 140 is introduced to the banking machine 130, the card reader retrieves the unique identifier on the PTC by electronically reading and decoding the machine readable information.

In addition to providing the PTC 140 to the banking machine 130, the player 110 also enters into the banking machine 130 a desired cash value that the player 110 wishes to obtain. If necessary, the player 110 also enters a PIN, which is used to verify permission to access to the independent financial account, and any other information that is required to access funds from the independent financial account.

At step 720, the unique identifier on the PTC 140 is matched to the same unique identifier that is stored on the cashless gaming database 170. To accomplish this step, the banking machine 130 transmits the unique identifier read from the PTC 140 to the authorization server 150. The authorization server 150, in turn, communicates with the cashless gaming database 170 in an attempt to match the unique identifier with the identifiers stored on the cashless gaming database 170. The authorization server 150 transmits the unique identifier read from the PTC 140 to the cashless gaming database 170 and issues a query to determine whether the same unique identifier is stored on the cashless gaming database 170. Once the cashless gaming database 170 locates the unique identifier issued in the query, at step 725, the cashless gaming database 170 retrieves the financial account information associated with the unique identifier and transmits the appropriate financial account information to the authorization server 150. The specific financial account information retrieved is dependent upon the cash access transaction requested by the player 110 in step 715 and the type of financial account from which the cash is being requested. For instance, certain requests may require an account routing number or a PIN, whereas this information may not be appropriate for other types of cash access requests.

At step 730, the authorization server 150 electronically issues a request to obtain cash from the independent financial account. The request includes the desired cash value and at least a portion of the financial account information retrieved from the cashless gaming database 170. Although the request attempts to transfer the desired cash value to the player 110, the total amount requested from the independent financial account may actually exceed the desired cash value to account for commissions and bank charges that may be assessed for performing the transaction. The authorization server 150 determines the total amount to request from the independent financial account, and once the total request amount has been established, the authorization sever 150 transmits the cash request to the authorization center 190, which is associated with the independent financial account.

At step 735, the authorization center 190 determines whether to approve the request. At step 740, if the request is not approved by the authorization center 190, a decline message is transmitted from the authorization center 190 to the authorization server 150. The authorization server then 150 instructs the banking machine 130 to display a message to the player 110 indicating that the request failed. Although the transaction was not successful insofar as the player 110 did not receive the requested cash, the transaction information is tracked and recorded nonetheless. Upon receiving the decline message, the authorization server 150 stores the relevant transaction information on the transaction database 160.

Returning to step 735, where the authorization center 190 determines whether to approve the request, if the request is approved by the authorization center 190, an authorization message is transmitted from the authorization center 190 to the banking machine 130 via the authorization server 150 at step 745. At step 750, the desired cash value is dispensed by the banking machine 130 to the player 110. If a commission is required for the transaction, the additional amount of the commission is also transferred from the independent financial account to the party receiving the commission. At step 755, the transaction information is tracked and recorded in the transaction database 160. Upon receiving the authorization message, the authorization server 150 stores the relevant transaction information on the transaction database 160.

In another aspect of the present invention, the player 110 interacting with the gaming machine 120 may similarly use the PTC 140 and the financial account information stored on the cashless gaming database 170 to transfer the desired cash value to the player by directly crediting the gaming machine 120 from the independent financial account. The steps required to perform this type of transaction are comparable to the steps described in FIG. 7, the primary differences being that the player 110 interacts with the gaming machine 120 rather than the banking machine 130 and rather than receiving the desired value in cash form, the desired value is credited directly to the gaming machine 120 from the independent financial account.

Because the transaction data may constitute valuable information to the casino, the casino may issue gaming points to the player 110 based on the number of withdrawal transactions performed by the player 110 with the PTC 140 or the amount withdrawn in those transactions. The awarded gaming points may be stored in the transaction database 160 or the player's club database 180 and associated with the unique identifier on the player's PTC 140. The system 100 thereby benefits both the player and the casino by integrating cash access and player tracking.

Figure 8:
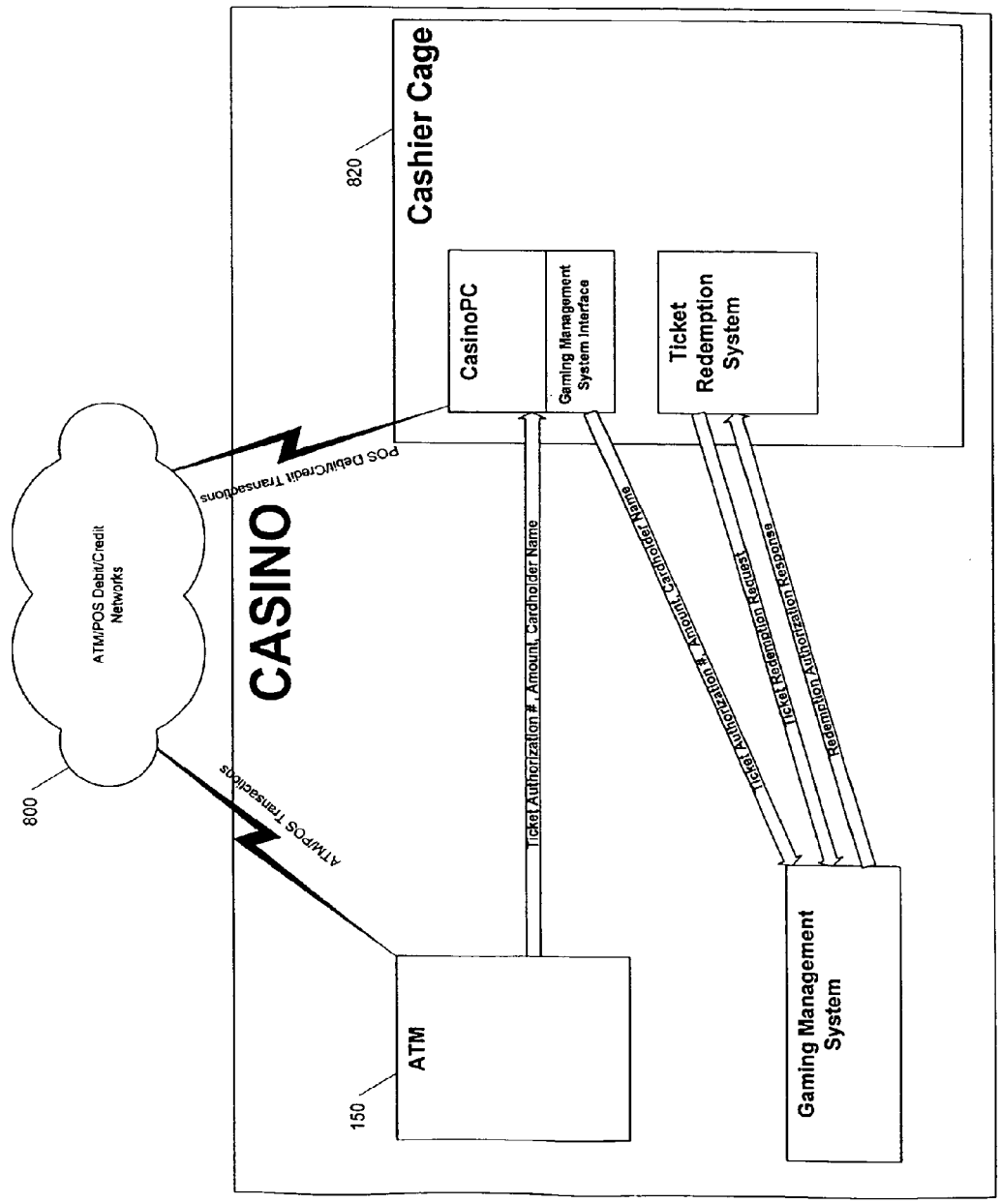
FIG. 8 provides a flow diagram illustrating one system and method that can be used for converting a ATM/POS debit/credit transaction into a negotiable casino ticket linked to a player tracking card in accordance with the present invention.

FIG. 8 provides a flow diagram illustrating another embodiment of the present invention. In this embodiment, the banking machine 140 can be used to dispense a casino ticket or other identification card that represents a cash value. In the first step, the casino patron (customer) swipes their identification card (such as a debit card, a credit card, a state issued ID or other identification token) and selects a financial transaction. In this example, the selected financial transaction would be the acquisition of a casino "ticket". Following selection, an amount of money is entered and an account type is selected, such as an ATM and/or POS debit or credit request. In the preferred embodiment, an account type is selected in order to minimize any fees, overhead and/or monetary limits. For example, a POS debit transaction may be preferred because it provides a higher limit withdrawal limit. Once the withdrawal amount and financial account have been collected, the banking machine 140 requires confirmation of identity by asking for a secret password, or code or other security device. Once the player 110 confirms his/her identity, the banking machine 140 will perform the requested transaction by transmitting request information to the ATM/Credit/POS debit network 800.

In the preferred embodiment, a third party intermediary records audit information associated with any requests and approvals in order to support redemption and anti-fraud detection systems managed by a casino or by the third party intermediary. Following approval of the transaction and creation of an audit trail, a casino ticket (not shown) with the withdrawal value (or some portion thereof) is issued to the player 110 by the banking machine 140. In this context, a casino ticket can be any number of identification cards or systems including a paper ticket with a bar code, a magnetic stripe card, a smart card, RFID or other portable digital memory that is encoded with personal and financial information. This casino ticket can then be used on a gaming machine as credit in connection with casino gaming or redeemed for cash. In the preferred embodiment, the customer 120 can either present the casino ticket for validation by a cashier at a cashier cage 820 or insert the casino ticket into a ticket redemption kiosk (including kiosks integrated with one or more casino game machines or other multi-purpose entertainment devices).

FIG. 8 provides a flow diagram illustrating one system that can be used for converting a ATM/POS debit/credit transaction into a negotiable casino ticket that can be linked to a player tracking system. As one skilled in the art would know, such a system provides a number of advantages over the prior art. The casino ticket could be negotiable within different areas (such as a group of mutually linked casinos, restaurants and service providers), to acquire different products or services (such as 50% or more must be used to purchase goods), to trigger different bonuses or awards (free games, discounts, casino points), or any number of features that either limit negotiation or enhance the functionality and features available to the player 110.

For example, a customer/player 110 could link a debit card with a player-tracking card in a casino database such that, whenever that same debit card is used to acquire a casino ticket, the ticket is encoded with that customer's player tracking code or ID. This could further be used to initiate certain security procedures or verifications that are stored in the casino's database that is associated with that player tracking code. A player could be asked to enter certain identification information (something they know, something they have or something they are) on certain types of types of machines. Likewise, gaming features could be provided at casino gaming machines in which such a casino ticket was entered. A customer that has entered a casino ticket onto a game machine could be provided with gaming audio and visual content that is associated with the user in the casino's player tracking/customer database. This embodiment provides a number of advantages. The casino ticket provides a simple financial tool that is highly managed from both an access standpoint (through dynamic security), from a negotiation standpoint (where it can be used and how) that is still highly portable and personalized.

Additional aspects of the invention will be described with reference to FIG. 9. As described in more detail below, the present invention may be implemented in other environments and in other ways. In particular, the invention may be implemented relative to "on-line" environments where the gaming machine is essentially virtual (such as where server-based games are presented to remote players, rather than just via traditional gaming machines) and wherein physical player tracking and/or banking cards (or other physical media) are not required.

As illustrated in FIG. 9, in one embodiment, a system 900 may again be configured to include one or more traditional gaming machines 920, such as may be located at one or more physical casinos. Preferably, the system 900 is also configured to present on-line games to a player, such as via one or more presentation devices 922 (it being understood that while there may be two or more presentation devices 922, for convenience herein, the system is primarily described relative to a player's use of a "presentation device 922"). In such a configuration, the system 900 may include one or more game servers 924 (it being understood that while there may be numerous game servers 924, for convenience herein, the system 900 is primarily described relative to a single "game server 924"). In this arrangement, the "gaming machine" is a combination of the presentation device 922 and the game server 924.

The presentation device 922 may be a dedicated/special purpose device or may be a general purpose device. The presentation device 922 is preferably an electronic device, and more preferably a computing device. The presentation device 922 may include at least one video display 928 capable of displaying game information, at least one player input device 929, and at least one communication interface.

The presentation device 922 might comprise, for example, a desktop computer 932, a telephone (including cellular, wireless or wired telephones) or PDA 934 (such as an iPhone®), a laptop or notebook computer 936, or various other devices. As indicated, the presentation device 922 might also comprise a special purpose device such as a specially configured gaming tablet.

The player input device 929 might comprise, for example, a keyboard, mouse, joystick, touch-screen, button(s), trackballs or other devices now known or later configured and which are capable of receiving input from a player. The communication interface is preferably configured to permit information or data to be exchanged from one or more remote device or locations with the presentation device 922. The one or more communication interface might support wired or wireless communications using various protocols. For example, if the presentation device 922 is a PDA, the communications might be by 3G, 4G, IMT, GSM or the like. If the presentation device 922 is a desktop computer, the communications might be by TCP/IP or the like. Of course, other protocols may be used such as Bluetooth, 802.11xx and the like.

It will be appreciated that the presentation device 922 may include other components. For example, the presentation device 922 may include a main processor, a video and/or audio processor, input and output ports or the like.

The game server 924 is preferably configured to either transmit game code to a remote location, execute game code and transmit game data or results to a remote location, or both, whereby a game may be presented to a user at a remote location, such as a player's presentation device 922. For example, the game server 924 may execute game code to implement a video poker game and then transmit game data such as data representing images of cards to the player's presentation device 922. In another embodiment, the game server 924 might transmit game code to the player's presentation device 922 for execution by that device, wherein the game data is generated at the remote or mobile device. A single game server 924 may be configured to service one or more players and there may be more than one such server 924.

Preferably, in at least one embodiment, the game server 924 offers one or more games to a player. Most preferably, the games are wagering or casino-style games.

In one embodiment, the game server 924 comprises means for generating game data or information and may also include means for receiving player input. Such means may comprise at least one processor. The processor is configured generate game information, such as based upon the execution of machine readable game code (i.e. software). Of course, the processor could also be pre-programmed or configured as hardware configured to generate such game data.

In one embodiment, the game server 924 includes means for storing information or instructions. Such means may comprise one or more memory devices. Such might comprise RAM, ROM (including EPROM, EEPROM, PROM) or other devices now known or later developed. The game server 924 might include one or more other memory devices, such as for storing game state information or the like, as detailed below. In one embodiment, the game server 924 might comprise or be in communication with one or more mass data storage devices, such as one or more hard drives or the like.

The game server 924 preferably also includes at least one communication interface, by which the game server 924 may receive and transmit information. As with the presentation devices 922, the communication interface(s) may permit communications in accordance with various protocols and in various forms. In one embodiment, the communication interface may be configured so that the game server 924 may transmit and receive data in accordance with a TCP/IP protocol over a wired network link with the Internet.

The game server 924 might actually comprise a system or network of a plurality of elements or device. For example, the game server 924 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the game server 924, such as to change operator settings and the like. The game server 924 might also comprise a router and one or more separate computing devices. The functions of the various computing devices might be segregated. For example, one computing device or server might provide core social media functions while another server might support or enable social media site gaming-related activity.

As described in more detail below, at one or more times a presentation device 922 and the game server 924 are linked by a communication link 938 between their communication interfaces. The type of communication link may vary, such as depending upon the particular type of presentation device 922 and/or the communication path or protocol which is utilized.

In one embodiment, the presentation device 922 and the game server 924 may communicate through at least one network. Such a network might comprise a public and/or private network, including the Internet, a cellular network, a satellite communication network or the like. The network may comprise wired and/or wireless links or pathways. Of course, the communication link might comprise a dedicated link, such as a dedicated wired link between the devices. Further, the communication link might comprise a number of local, wide area or other networks or pathways linked together.

As indicated above, the system 900 may include one or more gaming machines 920. The gaming machines 920 may be part of a gaming system, such as a casino gaming system which links multiple of the gaming machines, one or more table games and other devices such as kiosks, accounting systems or servers, progressive systems or servers, player tracking systems or servers or the like. As used herein, the term "gaming machine" may include other types of gaming machines or device. Such might comprise, for example, gaming tables. Such tables may be manually operated or be fully or partially automated. A variety of games may be offered at such tables. Of course, the gaming machines may include other types of devices as well.

As indicated above and as illustrated in FIG. 9, the system 900 of the invention may further comprise other systems and components similar to those illustrated in FIG. 1 and described above.

As indicated briefly above, while the present invention may be implemented relative to traditional gaming machines 920 and systems including such gaming machines, the present invention may also be implemented relative to systems which present games remotely, such as in an on-line environment. For example, the methods of the invention may be implemented relative to a system 900 which is illustrated in FIG. 9.

As one example, a player 910 may swipe their bank card 135 or PTC 140 at a presentation device 922 (when the presentation device 922 has an integral reader or when a peripheral reader is coupled to the presentation device 922, such as via a communication interface thereof). Upon swiping their bank card 135 or PTC 140, the player may engage in a standard gaming transaction, cashless gaming transaction or the like in similar manner to that described above.

Notably, the present invention may be implemented without use of a card whatsoever. For example, player account information may be associated with an RFID tag, a media which bears printed information such as a bar code, or other types of media. Thus, as used herein, the term "swipe" is not limited to merely passing a magnetically coded element relative to a reader (of a gaming machine 920 or a presentation device 922), but might comprise optically reading information, reading an RFID tag or acquiring information in other manners. In addition, it is possible for the player to provide account information without use of any media whatsoever. For example, a player might input account-identifying information, such as via a keypad 980 of a gaming machine 920 or via an input device 929 of a presentation device 922.

As one example, a player's bank account might be identified by a numeric account number. The player might input that account number to the gaming machine 920 or the presentation device 922. The player might further be required to input a PIN or other verification code. Likewise, a player's PCT account might be identified by a numeric account number (or other identifier which may comprise symbols, numbers, letters or combinations thereof). The player might input that account number to the gaming machine 920 or the presentation device 922. The player might again further be required to input a PIN or other verification code. In this manner, a player can identify themselves and/or access their bank or PTC account without a physical media.

Relative to the on-line environment, once a player has inputted their account information, the authorization server 950 processes the player's financial request in a similar manner to that described above and illustrated in FIGS. 3-5. For example, if authorization is approved, the transaction database is again updated and a receipt message may be provided to the player via their presentation device 922 (such a message may, for example, be transmitted from the authorization server 950 to the game server 924 and thereon to the player's presentation device 922). A player may use associated funds to place one or more wagers to play wagering or other games which are offered or supported by the game server 924.

In the online environment, account information (whether read from a card or input by the player) may be encrypted by the presentation device 922 before it is forwarded to the authorization server 950. The authorization server 950 then decrypts and uses the account/card data to determine if the information relates to a bank card 135 or a PTC 140. The player and financial information associated with the card is retrieved from the Cashless Gaming Database 960. Information previously provided by the player for their account in the Cashless Gaming Database 960 can be used to determine the default financial account and the default amount of the transaction or the player can be prompted for this information. The cash access transaction is then processed with the Authorization Centers 190 and The Player's Club Database 180 and the Transaction Database 160 are updated accordingly.

In another method of using a single card to identify a player, the presentation device 922 may be equipped with a camera (either integrated or as an associated peripheral device). The player may be prompted to take a photograph of the PTC 140 or their bank card 135. Depending upon the type of bank card being used, a photograph of both sides of the card may be required. The photograph is forwarded from the presentation device 922 to the authorization server 950. The authorization server 950 may perform an Optical Character Read "OCR" of the photo to extract the card number from the photograph. If the card number can be extracted then it is used to reference the players account in the Cashless Gaming Database 960. Assuming the card number extracted from the photograph matches a card number previously provided by the player, a transaction can be processed. Other information previously provided by the player for their account in the Cashless Gaming Database 960 can be used to determine the default financial account and the default amount of the transaction or the player can be prompted for this information. The cash access transaction is then processed with the Authorization Centers 990 and The Player's Club Database 980 and the Transaction Database 960 are updated accordingly.

Because the success rate of OCR scanning of photographs can vary widely, another method of using a single card to identify a player may be implemented. In this method the PTC 140 is printed with a barcode such as PDF417 as documented in ISO standard 15438. Other bar code formats such as QR Code may also be used. If desired, the barcode may be printed on documents distinct from the PTC 140 or distributed as an electronic document to the player. The presentation device 922 may be equipped with scanning software that can examine an image received by a camera. The player is prompted by the presentation device 922 to scan the barcode printed on their PTC 140 or other document. The data scanned is forwarded to the authorization server 950. The authorization server examines the player account in the Cashless Gaming Database 960. Assuming the scanned bar code data matches data previously associated with the player's account a transaction can be processed. Other information previously provided by the player for their account in the Cashless Gaming Database 960 can be used to determine the default financial account and the default amount of the transaction or the player can be prompted for this information. The cash access transaction is then processed with the Authorization Centers 990 and The Player's Club Database 980 and the Transaction Database 960 are updated accordingly.

Casino Digital Wallet

As indicated above, in one embodiment of the invention information regarding a player and information regarding a player's financial accounts are obtained and stored. This information may be linked to a player's tracking account or player tracking identifier. As one aspect of the invention, information regarding a player and/or information regarding a player's financial accounts may be part of a casino digital wallet. In one embodiment, the player's digital wallet may be linked to or accessed via their PTC 140 or player tracking account identifier. In other embodiments, as described in more detail below, a player's digital wallet may be linked to other identification cards or information (such as a vendor access card rather than a PTC 140).

For example, as detailed below, a player's casino digital wallet may contain or comprise information which includes one or more of the following: (1) player name or other player-identifying information; and (2) credit cards/accounts from various institutions, a plurality of debit card/account options, credit from a specific casino, checking or savings accounts, credit from a clearinghouse acting as a broker between financial institutions and the casino where credit may be desired, wagering instruments in various currencies, non-monetary currencies such as earned loyalty points and promotional credits and even other wallets.

FIG. 10 represents one embodiment of a casino digital wallet 1000 of the current invention. The casino digital wallet 1000 provides for storage of information needed to conduct financial transactions in a gaming environment. This information preferably includes identity information 1002 which identifies the owner of the wallet 1000, their credentials 1004, a default feature set 1006 and a default rule set 1008 for the wallet. The owner's credentials 1004 may include common identifiers such as mobile phone numbers, email addresses, PTCs which can be used to link to the owner of the wallet 1000 and vice versa. These credentials 1004 may also contain digital certificates which uniquely identify the owner and/or the wallet 1000 which can be used to confirm identity, participate in electronic authentications and communications when technologies such as DSA signatures, TLS and Public key Infrastructures require.

As illustrated, each financial account 1010 may be given a descriptive name 1012 and an account ID 1014 within the wallet 1000. If there is an external account reference number, that too may be stored in the wallet 1000. External account reference numbers may capture such things as credit card numbers and bank account numbers which are essential to conducting transactions between the wallet 1000 and external institutions. If known, the balance 1016 in the financial account may be stored in the wallet. However, for externally based accounts it may be necessary to inquire and update this balance at the time of each transaction.

Each account depicted in the wallet 1000 illustrated in FIG. 10 may be assigned a specific set of features called a feature set 1006. These feature configurations may be shared across financial accounts. The feature set 1006 preferably dictates the fundamental transactions that are possible for the wallet 1000 to perform using a player's financial account. While, as described below, a feature set 1022 may be associated with each individual account, if a feature set is not defined for a particular account, the default wallet level feature set 1006 may be utilized.

Rules for controlling balances and velocity limits and locations where each financial account may be used are preferably collected into rule sets 1020. A rule set 1020 may be assigned for each account 1010 in the wallet. If a rule set 1020 is not defined for an account, the default wallet level rule set 1008 may be used.

Since the wallet 1000 interacts with a variety of internal and external accounts, the wallet must contain or store information regarding how to access each such account. The specifics required to do so may be collected into an access configuration 1018. For example, the access configuration 1018 may include information regarding communication channel access points such as a URI, URL, IP address, dialup number, etc. for each account. In addition, relative to secured transactions, the access configuration 1018 may include information regarding security type or technique and security credentials such as passwords, certificates, PKI key pairs, PIN blocks, etc. In addition, where an external account is managed by an enterprise gateway, the access configuration 1018 may include information regarding the gateway(s).

In one embodiment, the wallet 1000 may store information regarding the status of each account, such as to allow or prevent access thereto. For example, accounts can be active, closed or locked, such as pending investigation. Other status types can easily be supported.

Assuming that an account 1010 is in an active status, the feature set 1022 and rule set 1020 for that account control how the player may use the wallet to intermediate access to the available sources illustrated in FIG. 10, such as to fund game play of wagering games within a casino, in one of a plurality of related casinos or for gaming on the internet at a specific website or group of related websites where the financial account is accepted.

A player's financial accounts 1010 may identify certain accounts as depository accounts. For example, a checking account or savings account may be designated to be a depository account. A depository account is desirable in order to receive funds from other accounts defined in the player's wallet. In addition, these depository accounts may electronically receive funds from external sources such as: (1) internet gaming sites; (2) virtual online gaming machines; and/or (3) banking machines. These deposits can occur upon demand by the player or via recurrent automated transfers. Further, the player may withdraw funds from a depository account via check, ATM, EFT networks, or via a teller at a bank. A debit card may be associated with the depository account to facilitate this. Again, based upon the features set, rules and access definitions of the wallet 1000, the transactional use of a depository account can be restricted for use at particular casinos, websites and virtual online gaming machines.

The player's gaming wallet 1000 of this invention may be further enhanced by including in the player's wallet 1000 reference to external digital wallets owned by the player having each their own credentials and collection of accounts, for instance, a Paypal™ account. These other external digital wallets provide additional or other financial sources and depository accounts available to the player. The transactional usage within gaming of an external digital wallet is managed in the same manner as other accounts in the player's gaming wallet 1000.

The invention preferably further provides a mechanism that allows for multiple internal wallets to be created and managed by a player. Multiple wallets may be desirable to segregate between competing casinos, differing casino game types, separate gaming jurisdictions, etc. These multiple wallets can be associated with each other as parent-child or peer-to-peer. For wallets which are children of the parent wallet, financial accounts defined as external can be shared between the wallets, whereas wallets related to each other as peers would not share their financial accounts. Regardless of the relationship, the credentials of the player are shared between these multiple internal wallets.

As indicated above, the wallet 1000 may have a default feature set 1006 and other feature sets 1022 may be associated with individual accounts 1010. FIG. 11 illustrates a number of embodiments of feature sets 1022.

One element of a feature set may be a designation as to whether purchases can be made using the account 1130. The ability to use an account to purchase a good or service is an important characteristic to be specified (for example, this feature set may control purchases by type of good or service; for example, this feature set might allow a player to make a non-gaming purchase of food or beverages, but not a gaming purchase of gaming machine credits, or other variations of controls). Typically goods or services in a gaming context would be wagering credits or wagering instruments but could also be food, beverage, show tickets, etc. When a purchase is made the account is debited for the amount of the purchase and they are remitted to the seller. If this attribute is set to No then the accounts associated with this attribute cannot be used to make purchases. If it is set to Yes then purchases can be made.

Another element of a feature set may be a designation regarding the ability to make a withdrawal from the account 1132. A withdrawal removes funds from the account 1010 to another account either internal or external to the wallet 1000. In effect a withdrawal is a transfer of funds. This allows the owner or operator of the wallet to prevent funds from leaving their system. For instance, it may be desirable to allow withdrawals when the currency type is widely negotiable and to prevent withdrawals if it is not. If this attribute is set to No then the accounts associated with this attribute cannot be withdrawn from. If it is set to Yes then withdrawals can be made The feature set may also control the ability to make a deposit into an account 1134. A deposit moves funds into the account from another account either internal or external to the wallet. In effect a deposit is another form of a transfer. This allows the owner or operator of the wallet to add funds from available sources. For instance, it may be desirable to allow deposits when the currency type of the account is a cash equivalent and when purchases are also allowed via the account. If this attribute is set to No then the accounts associated with this attribute cannot accept deposits. If it is set to Yes then deposits can be accepted.

A feature set may also include a designation of whether an account comprises a wagering instrument 1136. In a gaming context, a wagering instrument is a vehicle by which bets can be placed and wins can be paid. Poker chips and slot tickets or vouchers are examples of wagering instruments. Accounts in the wallet contain wagering instruments when the Wagering Instrument attribute is set to Yes. Often the currency of these wagering instruments can be exchanged for cash of an equivalent amount but this is not always so. In the case of play for fun games wherein no wager for money is permitted the wagering instrument would not have a cash equivalent currency and could not be exchanged.

Preferably, the funds in a single account 1010 must be of the same currency. The currency can be a real world currency such as United States Dollars (USD), sometimes called a cash equivalent currency, or it can be a virtual currency such as loyalty points awarded by a casino or online wagering site. Thus, the feature set may include information regarding the currency type 1138, which information defines the currency of the funds in the account. In the case of cash equivalents it can be set to a well known currency code such as those defined by the ISO 4217 standard. In the case of virtual currencies the casino or online wagering site operator will dictate the value to use. In the case of an account which references a wallet the currency type is not applicable (N/A) since the wallet manages the currencies of its respective accounts.

Accounts 1010 in a wallet 1000 can be internal to the wallet or external from the wallet. The relationship type 1140 defines attribute values to indicate whether the account is internal or external to the wallet. For example, accounts 1010 internal to the wallet 1000 may be used without reliance on external enterprise gateways or third party systems. However, accounts having an external relationship type may rely on gateways and third party systems for access.

Accounts 1010 can reference other wallets. Wallets referenced in this way are referred to as "sub-wallets". The wallet 1000 in which one of its accounts 1010 references a different wallet may be referred to as the "parent-wallet". When a sub-wallet is referenced by an account in a parent-wallet the sub-wallet accounts can then be used as sources for purchases, withdrawals and deposits. The relationship type 1140 of the sub-wallet can be either "child" or "peer". When this attribute is set to "child" the one or more of the accounts of the parent-wallet may be shared with the sub-wallet. This sharing is very useful to the player because it simplifies the configuration associated with enrollment of accounts, transferring of funds between wallets and the tracking of all related activity over time.

When the relationship type 1140 attribute is set to "peer", all the accounts in the sub-wallet are independent of the parent-wallet and unknown to it. Consequently the parent-wallet must communicate with the sub-wallet to learn what accounts are available and what the rules are related to the accounts. The parent-wallet uses the access configuration (1018; see FIG. 10) appropriate to the sub-wallet in order to communicate. This relationship type 1140 may be used to interoperate with a wallet offered by external enterprises like PayPal™ and Google™.

As indicated above, a wallet 1000 may include a default rule set 1006 and/or each account may be assigned a particular rule set 1020. Such rules or rule sets may, for example, control balances and limits of the various accounts in the wallet 1000. One example of various rule or rule sets will be described with reference to FIG. 12.

In one embodiment, rule sets 1022 may be named or designated with designators 1250. A named rule set 1050 is preferably associated with each account 1010 in the wallet 1000. A rule set may specify one or more of the following.

First, a rule set 1022 may include information regarding a minimum balance amount 1252 (such as defined by a numerical value in a particular currency). Transactions attempted against the account 1010 are preferably denied if the resulting balance would be less than the minimum balance value.

Second, a rule set 1022 might include information regarding a maximum balance amount 1254 (such as defined by a numerical value in a particular currency). Transactions attempted against the account 1010 are preferably denied if the resulting balance would exceed the maximum balance value.

The rule set 1022 may include cumulative limits on withdrawal amounts 1256. These limits can be applied across any time period, such as daily, weekly or monthly or other time frames, not all of which are represented in FIG. 12. Also not depicted in FIG. 12 are similar limits which can be set on deposits and purchases across various time periods. Either the wallet owner or the operator might set or define these limits.

The rule set 1022 might include information regarding jurisdiction policies 1264. Such information may determine which legal gaming jurisdictions may interoperate with the account using the rule set 1022. Jurisdictions may be countries, states, provinces, Native American tribes, etc. that have passed laws and/or regulations permitting gaming and/or the use of funds from the accounts for the designated purposes. If "none" is the value of the jurisdiction policy 1258, then the accounts associated with the rule set 1022 may preferably be used in any jurisdiction. Due to the highly fragmented and regulated nature of the gaming industry "none" may be an infrequently used value. Otherwise, particular jurisdictions may be defined by the policy 1258, as a particular state, country or the like.

The rule set 1022 may also include information regarding a gaming venue policy 1260. Such information may control or determine which gaming locations may interoperate with the accounts 1010 using the rule set 1022. Venues are typically locations in which wagering occurs such as casinos, online wagering sites, online virtual gaming machines. However the venue policy 1060 can be adapted to specify which banks, payment networks, ATM networks, etc may interoperate with the wallet and its accounts. The policy accommodates one or more venues. If "none" is the value of the venue policy 1260 then the accounts 1010 associated with the rule set might, for example, be usable anywhere. Of course, the rule set 1022 may be easily expanded for creating rules related to other aspects of financial transactions, such as transactions having certain fixed purchase amounts such as ATM withdrawals, etc. The rule set 1022 could contain cost metrics that measure the relative costs of doing typical transactions with any particular account. Comparing the relative transactional costs across accounts 1010 in the wallet 1000 can be used to select for either lower or highest transaction costs.

Each account 1010 may require its own specialized security and access mechanisms. The wallet 1000 allows the access method to be defined on a per account basis as illustrated in FIG. 13. For example, the access configuration 1018 information may include an access configuration ID field or information 1360, a security type 1362, security credentials 1364, and information regarding the enterprise or entity which operates or controls the account, or an enterprise ID 1366.

As stated above the use of rule sets allows accounts interoperability to be limited to specific gaming venues. FIG. 14 illustrates how a gaming venue policy 1468 may be used to accomplish this. Each gaming venue policy 1468 is assigned a unique name 1470 so that it can be easily referenced from a rule set 1020. The policy provides for one or more gaming venues 1472a, 1472b, 1472n to be identified per policy. The allowed identification values may be accessed from other tables (not shown), where additional descriptive information about the venue is recorded such as address, contact persons(s), Gateway IP addresses, etc. A value of "*all" may indicate that the accounts 1010 associated with the Venue Policy 1468 may be used at any gaming venue.

Likewise it may be necessary to restrict interoperability of accounts based upon the legal jurisdictions which control gaming. FIG. 15 illustrates how this is accomplished. Each jurisdiction policy 1574 is named 1576 so it can be easily referenced from a rule set 1020. The jurisdiction policy 1574 provides for one or more legal jurisdictions 1578a, 1578b, 1578n to be identified per policy. The allowed jurisdiction identification values may be accessed from other tables (not shown), such as where additional descriptive information about the jurisdiction is recorded such as State abbreviation, regulatory agency contacts, references to regulations, etc.

The jurisdiction policy 1574 and gaming venue policy 1468 are independently configurable and are independently examined in the course of transactions. However, the limitations of both policy types must preferably be satisfied for transactions to execute.

In use, the player's wallet accounts 1010 are set-up and a combination of credit, debit and depository accounts are identified and configured for the wallet 1000. The player might provide account information via a form which is supplied to the casino, by inputting the information into an electronic form or other on-line or computer environment or in other manners. In the preferred embodiment a cashless gaming database contains the wallet(s) associated with a particular player, where the wallet 1000 is represented by data, such as contained in one or more data files.

The player may be permitted to input various control data or preferences. For example, a player may be permitted to set limits for their entire wallet 1000 or for individual wallet accounts 1010 that specify the amount and frequency of transactions permitted for a daily, weekly, monthly or configurable time period. The player may also configure which accounts 1010 are to be available by transaction type. For instance the player may exclude their Visa account from funding gaming type transactions.

At this point in the set-up, depending on the gaming regulations, it may be desirable to include responsible gaming limits. Such limits may include daily limits, weekly limits, monthly limits, or other financial limits set based on a configurable time interval of player activity. For example, a casino may be required by the regulations of a specific jurisdiction to allow the player to play only $500 per day. Such information may be associated with the player's rule set 1020.

The casino may wish to set certain limits such as the maximum amount of funds per day that a player can transfer to a depository source in their financial account. Because funds in a depository source can be withdrawn in cash by the player such limits help reduce risk associated with fraud and money laundering. When jurisdictional limits are set they would take precedence over any player set limits.

Any number of credit, debit and depository sources may be allocated in the player's wallet database. These sources may include but not be limited to the following examples:

Debit Sources: examples include traditional debit cards issued by banks and other financial institutions in order for a patron to access funds held on account at the institution. Debit sources may include external financial institutions or the casino may also establish an account where a player may hold funds ahead of time which may be accessed.

Credit Sources: examples include traditional credit cards issued by banks and other financial institutions in order for a patron to access credit issued by a particular financial institution. Credit sources may include external financial institutions or the casino may also establish an account where a player may access credit for game play, retail purchases, service purchases, or amenity purchases such as room reservation, spa, etc.

Depository Accounts: examples include checking, saving and commercial accounts at financial institutions. Also includes e-wallets such as those operated by Paypal™, Google™ These sources can be used for purchases and deposits of all kinds, including purchases and deposits of gaming funds. In one embodiment, gaming funds can be transferred into and withdrawn via these accounts thus giving the player a way to convert gaming funds to cash.

Clearinghouse Loan: examples may include a $3^{rd}$ party that acts as a broker between a backend financial institution and a front end place of casino gaming such as a casino or casino gaming website.

Casino Credit: examples include credit issued by the casino for certain features such as casino gaming. Such credit may be further targeted to apply only to certain gaming offerings within the casino or on the casino internet website such as: slot machines, table games, bingo, poker, etc.

Vendor Credit: examples include credit issued by a vendor for only specific vendor oriented gaming products such as certain types of gaming devices based on the vendor. For example, one casino may issue credit to a player to play only at or on their casino slot games. Another embodiment may include Vendor Debit wherein the vendor provides a particular player funds to play only the games they have at the casino or the games they offer over the internet.

Key Player Bonus Cash: may include bonus funds provided to key players or to entice specific players to engage in casino gaming at a particular casino or on a particular casino gaming website. Such bonus cash may be issued as a promotion, enticement, or based on play activity such as the number of visits, the amount spent or other considerations that are important to the casino operator or the internet gaming casino operator.

Other sources are also possible such as third parties not associated with a financial institution or casino operator. For example, a company such as Hard Rock Cafe may issue credit or debit cards that can be used in any casino as a promotion for Hard Rock Café products. Additionally, stored value cards, gift cards or other similar cards enabling access to financial accounts and associated funds may be issued by a financial institutions or casino operator or $3^{rd}$ party to be used as a source of debit funds.

The player's financial account 1010 is then configured to include one or more of the defined sources, or the player may wish to opt-out and be a cash-only player. The player's wallet 1000 is then configured with all appropriate credit, debit, depository, loan, and other sources of available funding.

Once configured, the player may access any one of their funds/funding sources, such as to fund wagers used to play one or more wagering games. For example, where the player card 140 is configured to associate with one of the player's designated financial account(s) or to their digital wallet 1000, the player may take their card 140 to a banking machine, kiosk or to an attendant with a wireless remote device and use the card to provide access to their accounts and thus to funds associated therewith.

In the case of an online virtual gaming machine, the player may enter the unique identifier of their PTC 140 or their digital wallet 1000. The unique identifier may be scanned if it is a bar code, qcode, etc., or it might be manually input (such as in the case of a numeric code). Alternately, the player and their financial account may be known to the online virtual gaming machine via the player's sign on credentials (such as by storing associating data).

Once the player's identity and unique identifier has been validated by the gaming machine, bank machine, kiosk, remote device or online virtual gaming machine, the player is given options in order to select where the funds should come from. The source selected by the player may be from one or more defined sources associated with the player's financial account. For example where there is one source selected, the player may use debit funds available at an external financial institution.

Figure 16:
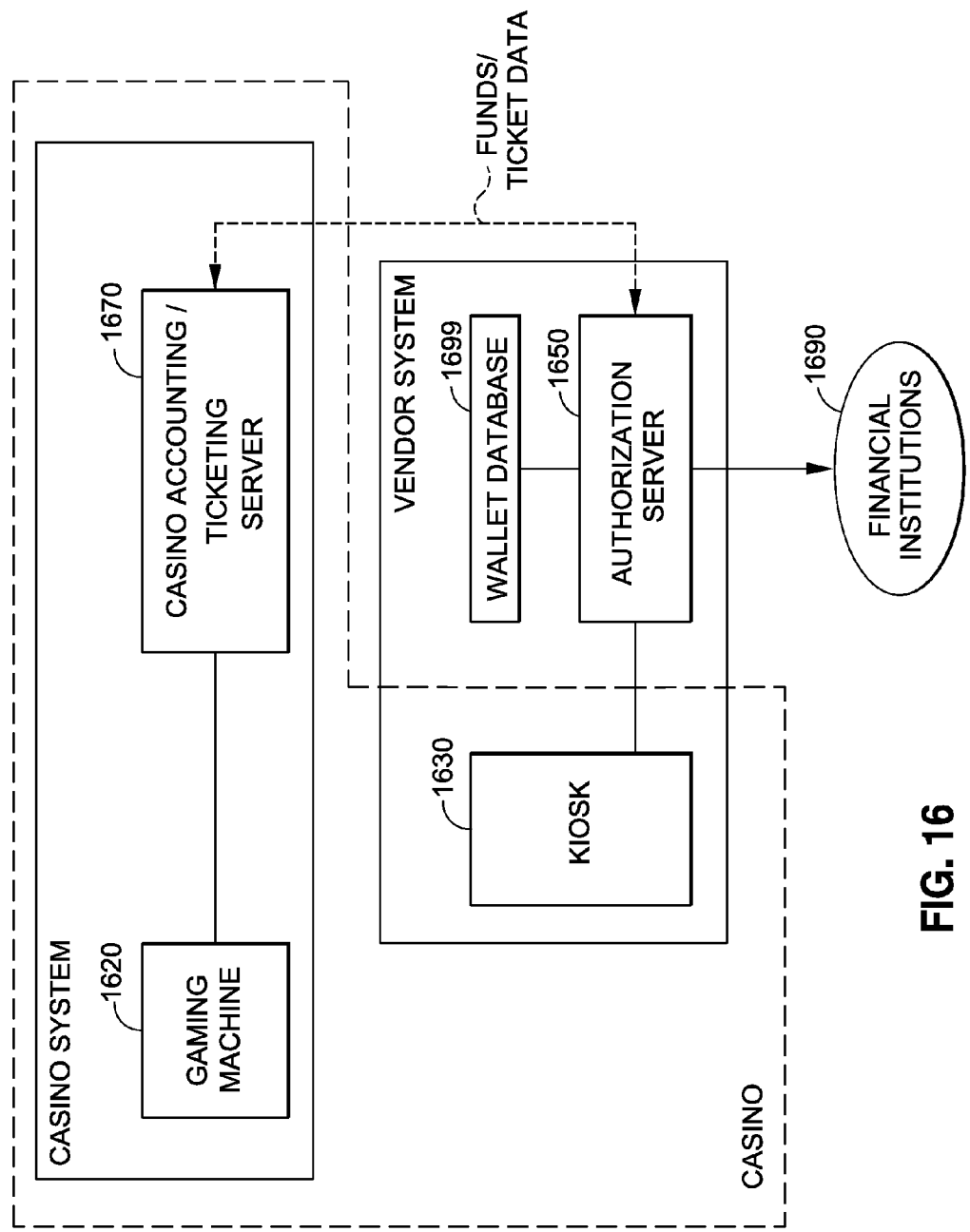
FIG. 16 illustrates a block diagram of another system in accordance with the invention.

While in a preferred embodiment, a player's casino player tracking account and/or card 140 are linked to one or more financial accounts and/or their digital wallet 1000, in another embodiment, such is not required. For example, in one embodiment of the invention, a casino need not link a player's tracking account/card 140 with the player's digital wallet 1000. As one example, referring to FIG. 16, a vendor might provide kiosks 1630 (which may comprise access points, banking machines or other devices) in one or more locations in a casino or in different casinos. A player might create a digital wallet 1000 with the vendor. For example, the funds vendor may store information regarding each player wallet 1000 in a wallet database 1699. The vendor might issue the player an access card or provide other access information. The player may then travel to a kiosk in a casino and, using their access card or other access information, access their digital wallet 1000 via the kiosk 1630.

In similar fashion to the above, when the player desires to engage in a transaction, they may input their card or other identifying information to the kiosk 1630, which kiosk may communicate with an authorization server 1650. The authorization server 1650 may use information regarding the player's wallet 1000, such as obtained from the wallet database 1699, to attempt to process a financial transaction. As indicated above, such a transaction may be performed relative to one or more financial institutions 1690.

In one embodiment, if the financial transaction is approved, i.e. funds are accessed or obtained, then the authorization server 1650 may communicate with a casino's cashless gaming system 1670 in order to obtain ticket information. The casino's cashless gaming system 1670 may generate ticket information for a ticket corresponding to the accessed funds. This information may be transmitted back to the authorization server 1650 and thereon to the kiosk 1630, whereupon the kiosk 1630 may generate and issue a value ticket. Notably, this value ticket may be presented at gaming machines, gaming tables or the like of the casino, whereupon those machines or devices may communicate to the casino's cashless gaming system 1670 in order to confirm the validity of the ticket.

In this or other configurations of the invention, the vendor's kiosk is preferably tied, such as via a back-end system, to the casino's accounting system. Thus, when a player seeks funds from an account associated with their digital wallet 1000, the funds might be transferable directly to the player's casino account which is managed by the casino. The player might then use the funds in their account within the casino, such as at a gaming machine or gaming table.

An authorization server may be configured to communicate with multiple casino systems. As indicated above, a vendor might place a kiosk in Casino A and a kiosk in Casino B. When a player accesses funds from their wallet via the kiosk in Casino A, the authorization server may communicate with Casino A's accounting system to generate the associated ticket. When a player accesses funds from their wallet via the kiosk in Casino B, the authorization server may communicate with Casino B's accounting system to generate the associated ticket. Likewise, a player may link their Casino A player tracking account and their Casino B player tracking account to a single wallet. If the player uses their Casino A player tracking card at a kiosk at Casino A, the authorization server may use the Casino A player tracking card information to access the player's digital wallet and then either transfer funds to a player account at Casino A or issue a funds ticket which is valid at Casino A. If the player uses their Casino B player tracking card at a kiosk at Casino B, the authorization sever may use the Casino B player tracking card information to access the player's digital wallet and then either transfer funds to a player account at Casino B or issue a funds ticket which is valid at Casino B. In this manner, a player may link different player tracking cards to different or the same digital wallet, wherein the wallet may be managed by the vendor.

There are several benefits to this configuration of the invention. First, a vendor can implement the invention and provide a player with access to funds via a kiosk, rather than having to modify all of the gaming machines at the casino to be capable of providing funds information and the like. Second, a player may generate a single digital wallet with a funds vendor where the funds vendor may have kiosks located at multiple different casino properties. Thus, the single digital wallet enables a player to access funds at multiple different casinos (as opposed to the player having to create a first digital wallet with a first casino property for use at that property, a second digital wallet with a second casino property for use at that property, etc., and where the player may then have to maintain multiple associated tracking cards or identifiers to access the different wallets).

Regardless of the implementation, because the player's digital wallet may be associated with multiple different funding sources, a player may choose to access funds from one or more of those sources, such as combinations thereof. For example, the player may wish to access $800, comprising $100 from a debit card, $200 from a credit card and $500 from casino credit. The combined amount once validated and approved by each of the chosen sources might then be issued as a $800 cash ticket that can be used anywhere in the casino. In the case of an online virtual gaming machine the validated amount may be credited to the player's wagering account where it can be used for betting on the online virtual gaming machine or elsewhere on the internet gaming website.

The disclosed system includes logic that prevents the player from using specific sources of funding which may depend on various criteria, such as: 1) the desires of the casino or internet casino operator, or 2) the regulatory rules in a particular gaming jurisdiction. For example, credit cards may not be allowed on a casino gaming floor but may be allowed to be used in an on-line/Internet environment. Other examples may require consideration of gaming regulations within a gaming jurisdiction such that one gaming jurisdiction may only allow debit play while another gaming jurisdiction may allow both debit and credit.

Logic/information may also be used to control the use of depository sources. For example, in one confirmation, funds in wagering account or online virtual gaming machines may not be allowed to be transferred to depository sources.

Where a player wishes to access funds without leaving a physical gaming table, a wireless remote access device may be provided to the player by an attendant where selection of amounts and funding sources may be made by the player upon validation of the player's account information.

When a player accesses their wallet 1000 and one or more designated accounts, the account information, access configuration 1018 and other information stored in the wallet is preferably utilize to access the desired funds. In the case of external (i.e. outside of the casino which generated the wallet 1000) financial institutions, this information may be used to contact the institution and effect a financial transaction for the player, such as by effecting a withdrawal of funds from a checking/savings account, seeking an amount of credit from a credit card, etc. Likewise, a player may associate funds with a designated account 1010. For example, a player might win a $10,000 jackpot. Upon winning the jackpot, the player could seek to have the funds directly deposited into their savings account.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments that have been described in detail therein. Rather, reference should be made to the appended claims as indicative of the scope and content of the present invention.

What is claimed is:

1. A multi-function player tracking system comprising:
an authorization server configured to (i) receive a request from a player at a gaming machine or a cash access kiosk to authorize a financial transaction with an independent financial account, the request including player independent financial account information, (ii) in response to the request to authorize the financial transaction, prompt the player via the gaming machine or the cash access kiosk to enroll in a player tracking system, (iii) when the player enrolls, receive personal identification information for the player, and (iv) when the player enrolls, generate a unique identifier that uniquely identifies the player and issue the unique identifier to the player;
a transaction database communicatively coupled to the authorization server configured to store player transactions and associate the player transactions with the unique identifier;
a cashless gaming database communicatively coupled to the authorization server configured to store the independent financial account information provided by the player and to associate the independent financial account information with the unique identifier; and
a player's club database communicatively coupled to the authorization server configured to store the personal identification information received for the player, the personal identification information received at least in part from the independent financial account information, to associate the personal identification information with the unique identifier, to store gaming points awarded to the player, to associate the gaming points with the unique identifier, and to increment and decrement the gaming points according to the player's accumulation and usage of the gaming points.

2. The multi-function player tracking system according to claim 1, wherein the independent financial account information includes information required to conduct electronic financial transactions with the independent financial account, and the authorization server is configured to authorize additional transactions upon receipt of the unique identifier from the player using the independent financial account information stored in the cashless gaming database.

3. The multi-function player tracking system according to claim 2, wherein the player's club database increments the gaming points when the player completes the financial transaction after enrolling in the player tracking system.

4. The multi-function player tracking system according to claim 1, wherein the cashless gaming database is configured to store information regarding at least two different independent financial accounts associated with the player which are maintained by at least one financial institution and associate the stored information with the unique identifier.

5. The multi-function player tracking system according to claim 1, wherein the unique identifier is issued to the player in association with an access card.

6. A method for enrolling a player in a multi-function player tracking system that includes an authorization server, a transaction database, a cashless gaming database, a player's club database, at least one cash access kiosk, and a plurality of gaming machines, the method comprising the steps of:
receiving a request at the authorization server from the player at one of the plurality of gaming machines or the at least one cash access kiosk to authorize a financial transaction with an independent financial account, the request including player independent financial account information;
in response to the request to authorize the financial transaction, prompting the player via the one gaming machine or the at least one cash access kiosk to enroll in the multi-function player tracking system;
when the player enrolls, receiving at the authorization server personal identification information for the player;
generating at the authorization server a unique identifier that uniquely identifies the player;
issuing the unique identifier to the player;
storing in the transaction database communicatively coupled to the authorization server a player transaction and associating the player transaction with the unique identifier;
storing the independent financial account information provided by the player in the cashless gaming database communicatively coupled to the authorization server and associating the independent financial account information with the unique identifier;
storing the personal identification information received for the player, the personal identification information received at least in part from the independent financial account information and associate the personal identification information with the unique identifier in the player's club database;
storing gaming points awarded to the player in the player's club database communicatively coupled to the authorization server and associating the gaming points with the unique identifier; and
incrementing and decrementing the gaming points according to the player's accumulation and usage of the gaming points.

7. The method according to claim 6, wherein the independent financial account information includes information required to conduct electronic financial transactions with the independent financial account, and the authorization server is configured to authorize additional transactions upon receipt of the unique identifier from the player using the independent financial account information stored in the cashless gaming database.

8. The method according to claim 6, wherein the player's club database increments the gaming points when the player completes the financial transaction after enrolling in the multi-function player tracking system.

9. The method according to claim 6, wherein the cashless gaming database is configured to store information regarding at least two different independent financial accounts associated with the player which are maintained by at least one financial institution and associate the stored information with the unique identifier.

10. The method according to claim 6, wherein the unique identifier is issued to the player in association with an access card.

11. A method for enrolling a player in a multi-function player tracking system that includes an authorization server, a transaction database, a cashless gaming database, a player's club database, at least one Automated Teller Machine (ATM), and a plurality of gaming machines, the method comprising the steps of:
receiving, at the authorization server, a request from a player to access funds from a player's external bank account via a bank card provided to the ATM;

in response to receiving said request, sending the request to a banking system for approval and if approved, dispensing the funds via the ATM;

in response to receiving said request, prompting said player to enroll in a casino player tracking system via said ATM;

when the player enrolls, receiving at the authorization server personal identification information for the player, the personal identification information being provided at least in part by information in the request, and storing the personal identification information in the player's club database;

generating at the authorization server a unique identifier that uniquely identifies the player and storing the unique identifier in association with the personal identification information in the player's club database;

issuing the unique identifier to the player;

storing in the transaction database communicatively coupled to the authorization server a player transaction and associating the player transaction with the unique identifier;

storing the independent financial account information provided by the player in the cashless gaming database communicatively coupled to the authorization server and associating the independent financial account information with the unique identifier.

\* \* \* \* \*